United States Patent
O'Donnell et al.

(10) Patent No.: US 9,815,595 B2
(45) Date of Patent: Nov. 14, 2017

(54) ATTACHMENT TAGS

(71) Applicant: Bedford Industries, Inc., Worthington, MN (US)

(72) Inventors: Colin M. O'Donnell, Bigelow, MN (US); Curtis J. Heinrichs, Sibley, IA (US); Jeffrey Tschetter, Sioux Falls, SD (US); Mike Schultz, Worthington, MN (US); David Schiller, Sioux Falls, SD (US)

(73) Assignee: BEDFORD INDUSTRIES, INC., Worthington, MN (US)

( * ) Notice: Subject to any disclaimer, the term of this patent is extended or adjusted under 35 U.S.C. 154(b) by 32 days.

(21) Appl. No.: 14/422,116

(22) PCT Filed: Aug. 29, 2013

(86) PCT No.: PCT/US2013/057272
§ 371 (c)(1),
(2) Date: Feb. 17, 2015

(87) PCT Pub. No.: WO2014/036246
PCT Pub. Date: Mar. 6, 2014

(65) Prior Publication Data
US 2015/0239615 A1    Aug. 27, 2015

Related U.S. Application Data

(60) Provisional application No. 61/736,962, filed on Dec. 13, 2012, provisional application No. 61/694,597, filed on Aug. 29, 2012.

(51) Int. Cl.
*B65D 25/20* (2006.01)
*B65D 65/14* (2006.01)
(Continued)

(52) U.S. Cl.
CPC ........ *B65D 25/205* (2013.01); *B32B 37/1284* (2013.01); *B32B 37/18* (2013.01);
(Continued)

(58) Field of Classification Search
CPC ...... B65D 25/20; B65D 25/205; B65D 33/16; B65D 23/14; B65D 73/0064; B65D 65/14;
(Continued)

(56) References Cited

U.S. PATENT DOCUMENTS 424,411 A    3/1890 Fielder
5,490,658 A    2/1996 Coward et al.
(Continued)

FOREIGN PATENT DOCUMENTS

WO    2007084119 A1    7/2007
WO    2011020084 A1    2/2011

OTHER PUBLICATIONS

International Search Report and Written Opinion dated Nov. 21, 2013 for corresponding International Patent Application No. PCT/US2013/057272, filed Aug. 29, 2013.
(Continued)

*Primary Examiner* — Patricia L Nordmeyer
(74) *Attorney, Agent, or Firm* — Mai-Tram D. Lauer; Westman Champlin & Koehler, P.A.

(57) ABSTRACT

An attachment tag that includes a tag portion having a first surface and a second surface, and an adhesive layer disposed on the second surface of the tag portion and configured to adhere to a product. The attachment tag also includes an elastomer portion having an expandable portion configured to further secure the attachment tag to the product and/or to secure the attachment tag to a second product, and a layer portion that is co-extensive with the expandable portion, and includes a bond zone that is bonded to the tag portion.

17 Claims, 19 Drawing Sheets

(51) Int. Cl.
B32B 38/00 (2006.01)
B32B 37/12 (2006.01)
B32B 38/10 (2006.01)
G09F 3/14 (2006.01)
B65D 23/14 (2006.01)
B65D 73/00 (2006.01)
B65D 33/16 (2006.01)
B32B 37/18 (2006.01)

(52) U.S. Cl.
CPC ...... *B32B 38/0012* (2013.01); *B32B 38/0032* (2013.01); *B32B 38/10* (2013.01); *B65D 23/14* (2013.01); *B65D 25/20* (2013.01); *B65D 33/16* (2013.01); *B65D 65/14* (2013.01); *B65D 73/0064* (2013.01); *G09F 3/14* (2013.01); *B32B 2037/1246* (2013.01); *B32B 2305/02* (2013.01); *B32B 2405/00* (2013.01); *Y10T 428/1476* (2015.01); *Y10T 428/24008* (2015.01)

(58) Field of Classification Search
CPC . B32B 38/0012; B32B 38/10; B32B 38/0032; B32B 37/18; B32B 37/1284; B32B 2305/02; B32B 2037/1246; B32B 2405/00; G09F 3/14; Y10T 428/1476; Y10T 428/24008; Y10T 428/14; Y10T 428/28
See application file for complete search history.

(56) References Cited

U.S. PATENT DOCUMENTS

| 5,782,495 | A | | 7/1998 | Grosskopf et al. | |
|---|---|---|---|---|---|
| 6,082,777 | A | * | 7/2000 | Grosskopf | B32B 7/04 |
| | | | | | 215/12.1 |
| 6,116,653 | A | * | 9/2000 | Oberholzer | G09F 3/14 |
| | | | | | 283/101 |
| 6,361,010 | B1 | | 3/2002 | Grosskopf et al. | |
| 7,836,622 | B1 | * | 11/2010 | King | G09F 3/0289 |
| | | | | | 206/820 |
| 2006/0019052 | A1 | * | 1/2006 | Plummer | G09F 3/14 |
| | | | | | 428/40.1 |
| 2010/0139133 | A1 | | 6/2010 | Adams | |

OTHER PUBLICATIONS

The First Examination Report in corresponding New Zealand Patent Application No. 704974 dated Jul. 26, 2016.
The First Examination Report in corresponding Australian Patent Application No. 2013308706 dated Aug. 5, 2016.
Examination Report No. 3 dated Mar. 9, 2017 for New Zealand Application No. 704974.

* cited by examiner

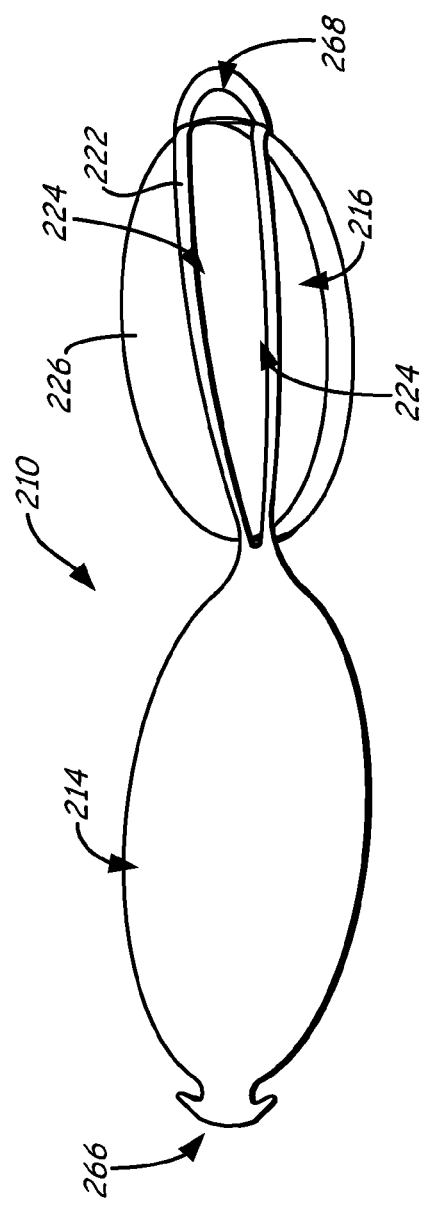
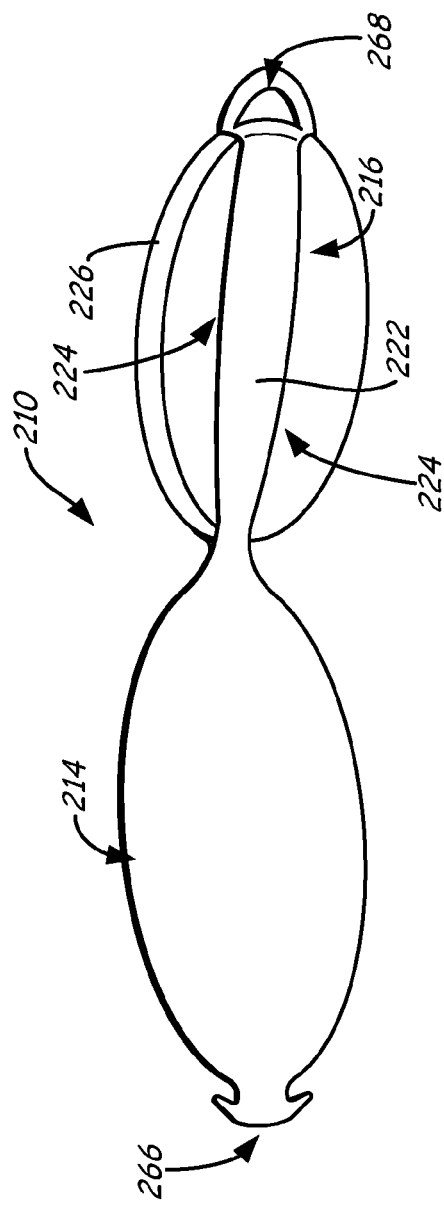
FIG. 14A
FIG. 14B

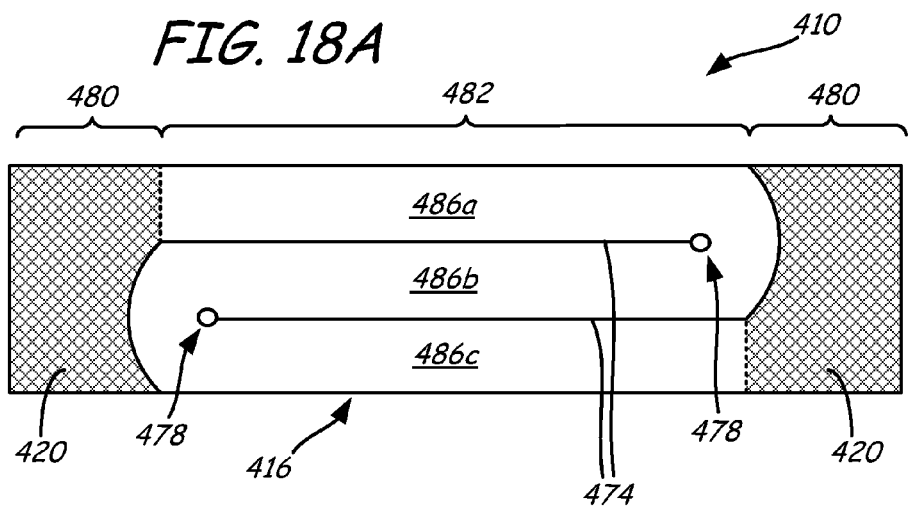
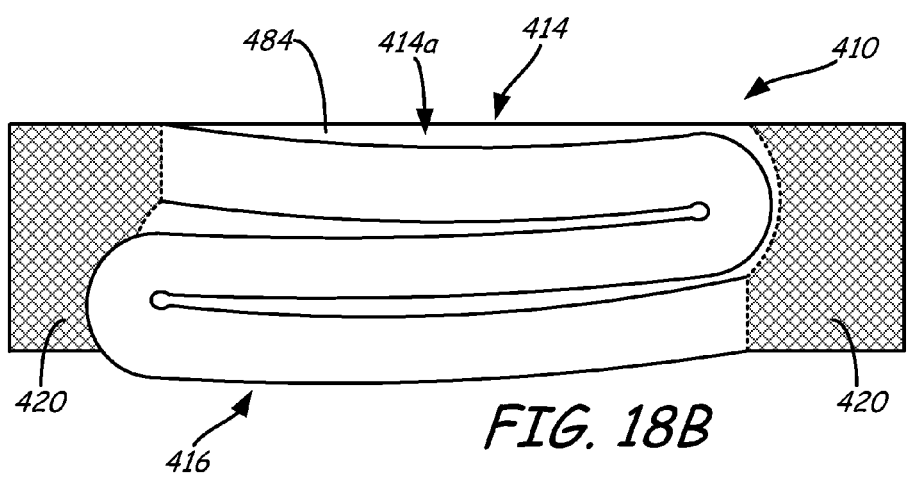
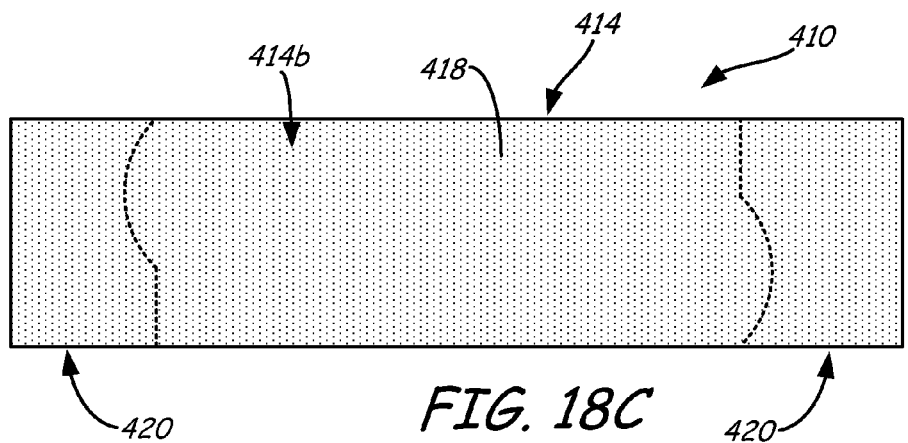

FIG. 20
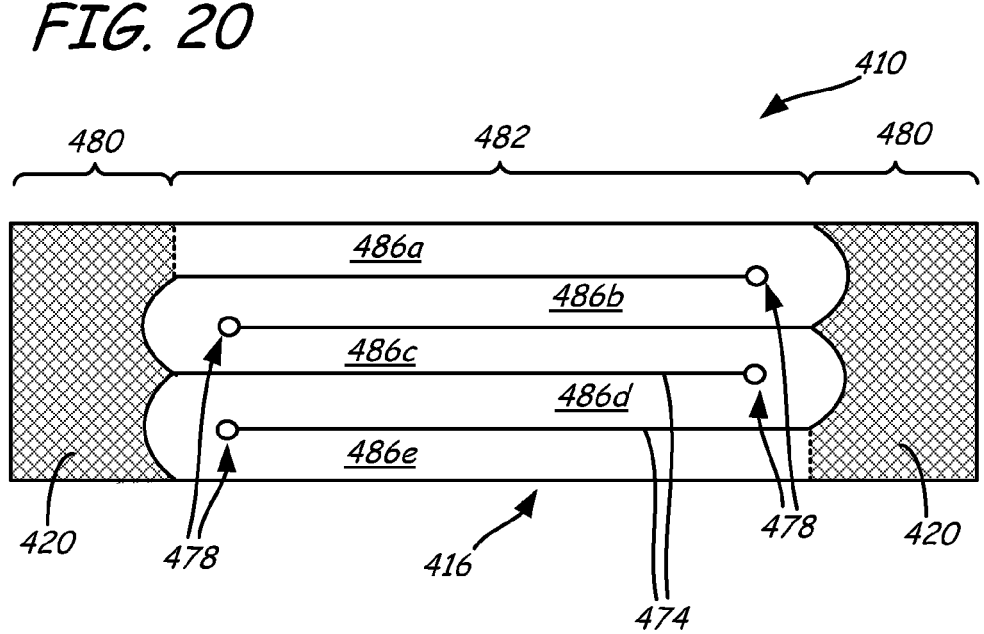
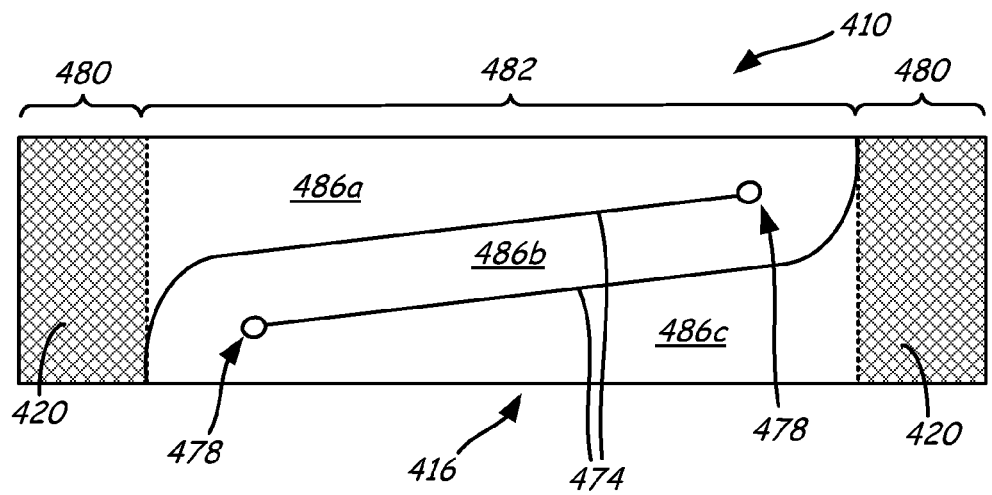
FIG. 21

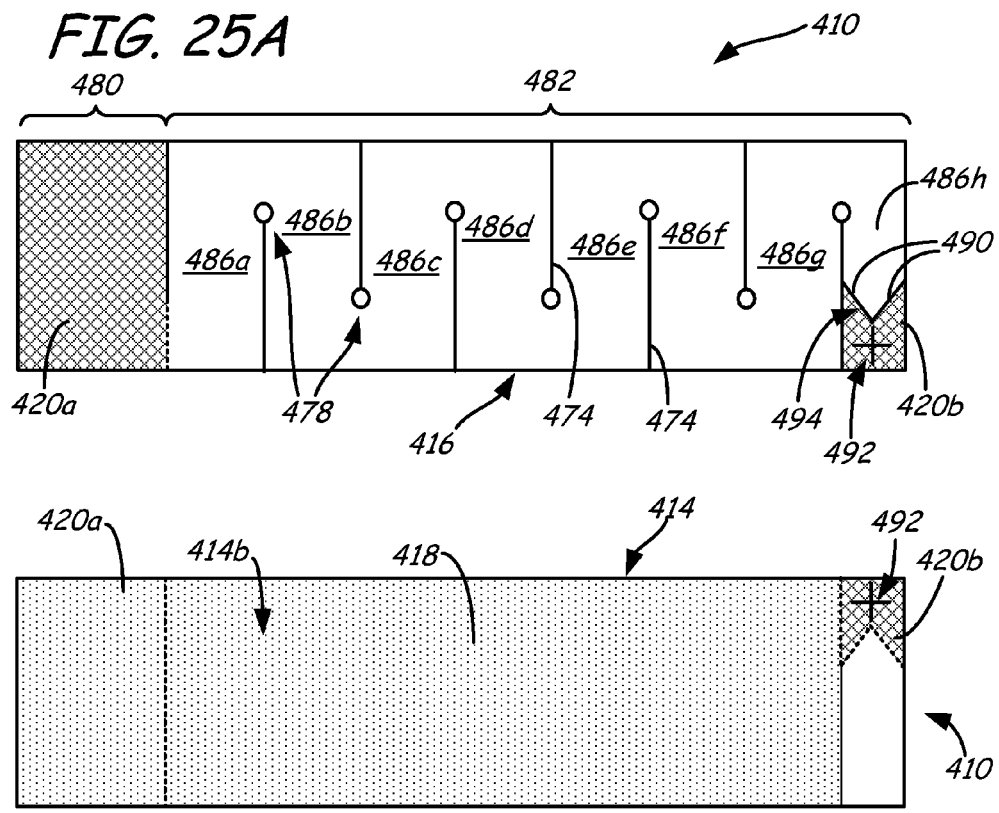
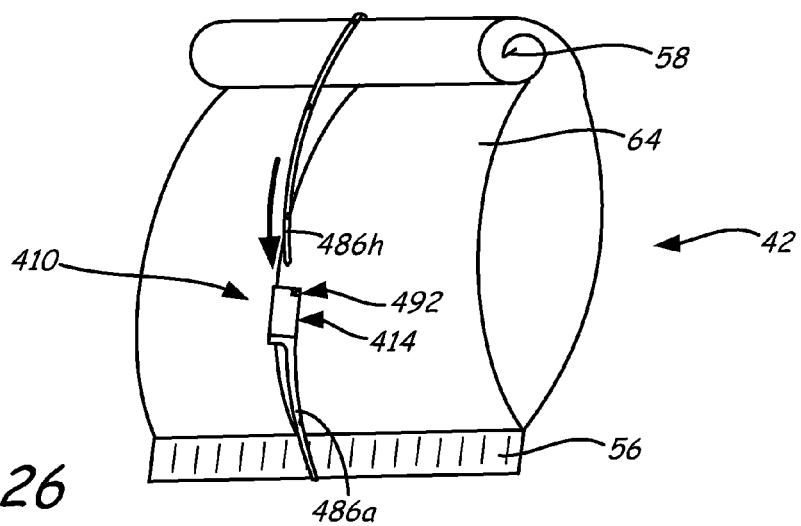

ATTACHMENT TAGS

CROSS-REFERENCE TO RELATED APPLICATION

This Application is a Section 371 National Stage Application of International Application No. PCT/US2013/057272, filed Aug. 29, 2015 and published as WO 2014/036246 A1 on Mar. 6, 2014, in English, which claims priority to U.S. Provisional Patent Application No. 61/694,597, filed on Aug. 29, 2012, and to U.S. Provisional Patent Application No. 61/736,962, filed on Dec. 13, 2012; each of which is hereby incorporated by reference in its entirety.

BACKGROUND

The present disclosure relates to a tag article and in particular to an article with a tag portion and an expandable loop portion. The disclosure also describes methods for using the tag article with an object.

Tag articles according to the present disclosure can be fastened to various manufactured products and other articles to convey information or serve another function. Exemplary functions include, for example, carrying a sample of a second product on a first product, providing a means for resealing a bag on which the tag article is fastened, retaining articles together, or permitting an article to be affixed to another item (e.g., onto a product or sales display). Such tag articles can be pre-printed with text or other information or include other indicia or distinguishing features. Depending upon the application and design, tag articles are attached to various products using different attachment mechanisms.

SUMMARY

The present disclosure is directed to an attachment tag that includes a tag portion having a first surface and a second surface, and an adhesive layer disposed on the second surface of the tag portion and configured to adhere to a product. The attachment tag also includes an elastomer portion having an expandable portion configured to further secure the attachment tag to the product or to secure the attachment tag to a second product, and a layer portion that is co-extensive with the expandable portion, and includes a bond zone that is bonded to the tag portion.

Another aspect of the present disclosure is directed to a supply of multiple attachment tags. The supply includes a release liner having a first surface and a second surface, where the first surface has one or more release agents. The supply also includes the multiple attachment tags that are removably affixed to the release liner. Each attachment tag includes an adhesive layer releasably adhered to the first surface of the release liner, a tag portion disposed against the release layer on an opposing side from the release liner, and an elastomer portion. The elastomer portion includes an expandable portion, and a layer portion that is co-extensive with the expandable portion, where the layer portion comprises a bond zone that is bonded to the tag portion and is spaced from the expandable portion.

Another aspect of the present disclosure is directed to a method for using an attachment tag with a product. The method includes affixing an adhesive layer of the attachment tag to the product, where the attachment tag also includes an elastomer portion and a tag portion bonded to the elastomer portion along a bond zone, and where the adhesive layer is disposed on the tag portion. The method also includes expanding the elastomer portion, and performing an action that includes securing the expanded elastomer portion around the product and/or securing the expanded elastomer portion around a second product.

This summary is provided to introduce a selection of one or more concepts in a simplified form that are further described below in the Detailed Description. This summary is not intended to identify key features or essential features of the claimed subject matter, is not intended to describe each disclosed embodiment or every implementation of the claimed subject matter, and is not intended to be used as an aid in determining the scope of the claimed subject matter. Many other novel advantages, features, and relationships will become apparent as this description proceeds. The figures and the description that follow more particularly exemplify illustrative embodiments.

DEFINITIONS

Unless otherwise specified, the following terms as used herein have the meanings provided below:

The term "providing", such as for "providing an attachment article", when recited in the claims, is not intended to require any particular delivery or receipt of the provided item. Rather, the term "providing" is merely used to recite items that will be referred to in subsequent elements of the claim(s), for purposes of clarity and ease of readability.

The terms "about" and "substantially" are used herein with respect to measurable values and ranges due to expected variations known to those skilled in the art (e.g., limitations and variabilities in measurements).

BRIEF DESCRIPTION OF THE DRAWINGS

The disclosed subject matter will be further explained with reference to the attached figures, wherein like structure is referred to by like reference numerals throughout the several views.

FIG. 14A is a top perspective view of the third embodied attachment tag with an object inserted through the slots of the elastomer portion.

FIG. 14B is a bottom perspective view of the third embodied attachment tag with an object inserted through the slots of an elastomer portion of the attachment tag.

FIG. 18A is a front view of a fifth embodied attachment tag of the present disclosure, having a band-shaped tag portion and elastomer portion with three leg segments.

FIG. 18B is a front view of the fifth embodied attachment tag with sections of the elastomer portion.

FIG. 18C is a rear view of the fifth embodied attachment tag.

FIG. 20 is a front view of a sixth embodied attachment tag of the present disclosure, having a band-shaped tag portion and elastomer portion with five leg segments.

FIG. 21 is a front view of a seventh embodied attachment tag of the present disclosure, having a band-shaped tag portion and elastomer portion with three angled leg segments.

FIG. 25A is a front view of a tenth embodied attachment tag of the present disclosure, having a band-shaped tag portion and elastomer portion, and an insertable tab and hole arrangement.

FIG. 25B is a rear view of the tenth embodied attachment tag.

FIG. 26 is a perspective view of a rolled and reclosed package using the tenth embodied attachment tag.

Although the above-identified figures set forth various features of the disclosed subject matter, other combinations of features are also contemplated, as noted in the disclosure. In all cases, this disclosure presents the disclosed subject matter by way of representation and not limitation. It should be understood that numerous other modifications and feature combinations can be devised by those skilled in the art which fall within the scope and spirit of the principles of this disclosure. It should be understood that the figures have not been drawn to scale as it has been necessary to enlarge certain portions for clarity of illustration.

DETAILED DESCRIPTION

The present disclosure is directed to attachment tags for retaining a variety of different product samples. As discussed below, the attachment tags of the present disclosure include tag portions and elastomer portions connected to the tag portions. In some embodiments, the tag portions may be adhered to retail products, allowing the attachment tags to be suspended from other products or retention mechanisms (e.g., hooks) via the elastomer portions. Alternatively (or additionally), the elastomer portions may be configured to wrap around flexible containers, such as food bags or packages, to function as reclosure devices to keep the flexible containers closed between uses. Additionally, the tag portions of the attachment tags may function as product tags to display information (such as human or machine-readable indicia) related to the retail products. Although the present disclosure recites a variety of illustrative uses for the attachment tags, use is not limited to the specific applications described herein.

Figure 1:
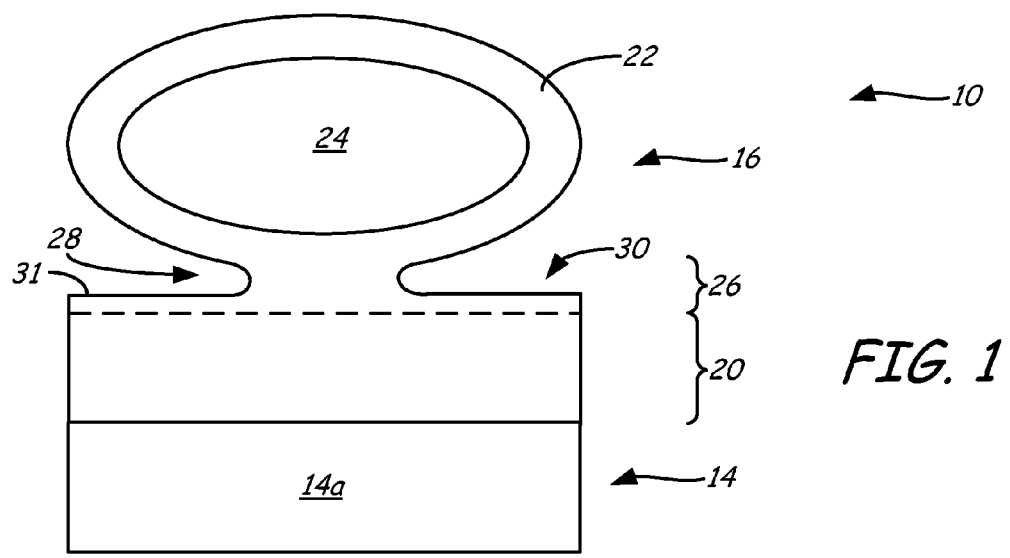
FIG. 1 is a front view of a first embodied attachment tag of the present disclosure.
Figure 2:
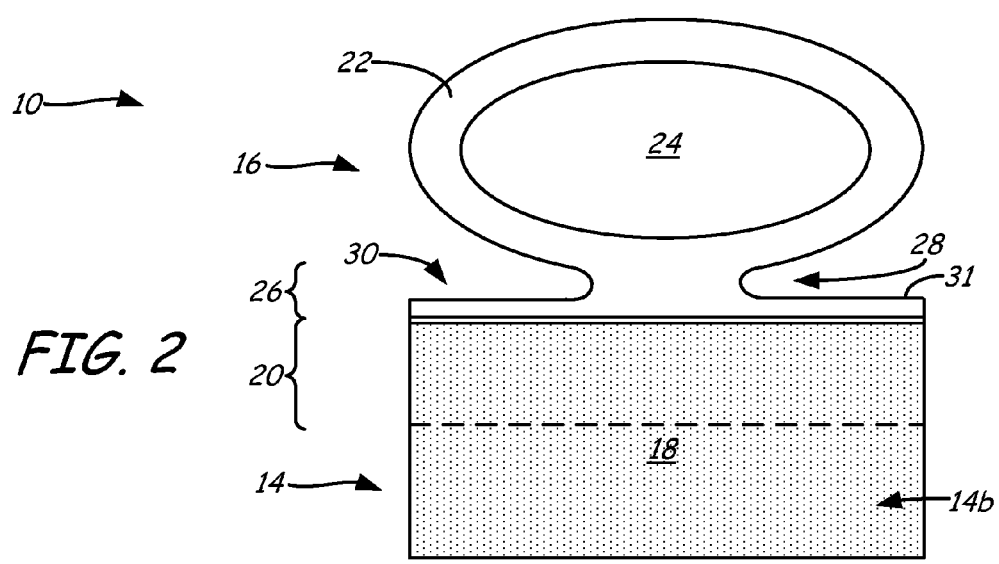
FIG. 2 is a rear view of the first embodied attachment tag.

FIGS. 1-9B illustrate attachment tag 10, which is a first embodied attachment tag of the present disclosure that may be adhesively secured to a retail product or sample, where multiple attachment tags 10 may be provided on a liner (e.g., liner 12, shown in FIGS. 3 and 4) for use. As shown in FIGS. 1 and 2, attachment tag 10 includes tag portion 14 and elastomer portion 16, where tag portion 14 includes a first face or front surface 14a (shown in FIG. 1) and a second face or rear surface 14b (shown in FIG. 2).

Tag portion 14 may be derived from one or more paper and/or polymeric materials, and may include an adhesive layer 18 applied over at least a portion of second face 14b (shown in FIG. 2), as discussed below. Examples of suitable materials for tag portion 14 include films of polyethylene terephthalate, polyethylene, polypropylene (e.g., oriented polypropylene), and combinations thereof. Tag portion 14 in an exemplary embodiment is formed of materials such as those commercially available under the trade designation "TESLIN" from PPG Industries, Pittsburgh, Pa.

In some embodiments, tag portion 14 is formed at least in part from biodegradable, degradable, or recyclable materials (e.g., one or more polypropylene and/or styrene-based materials), and may be suitable for receiving printed information (such as human or machine-readable indicia). Additional examples of suitable materials for tag portion 14 include those recited for the tag portion in King et al., U.S. Pat. No. 7,836,622; Ludlow et al., U.S. Pat. No. 7,281,345; and Ludlow et al., International Application Publication No. WO07/084119.

Elastomer portion 16 extends from tag portion 14 and is formed of a relatively thin sheet of one or more elastomeric materials, and is conjoined with tag portion 14 along a sheet-like bond zone or bonding segment 20. In particular, bonding segment 20 overlaps with tag portion 14 and is bonded to at least a portion of first face 14a of tag portion 14. The overlapping region of bonding segment 20 and first face 14a of tag portion 14 is sufficient such that elastomer portion 16 does not separate from tag portion 14 during use.

Suitable elastomeric materials for elastomer portion 16 include thermoplastic elastomers, such as styrenic block co-polymers (e.g., styrene-butadiene styrene and styrene-ethylene-butylene styrene), olefinic elastomers (e.g., ethylene and polypropylene based polyvinyl chloride-based elastomers, urethanes, nylon, silicon, and the like. The elastomeric material(s) provide elastomer portion 16 with sufficient elasticity to be stretched and to bounce back from a stretched condition.

Elastomer portion 16 includes a relatively flexible portion that extends from bonding segment 20 to form expandable loop 22. Expandable loop 22 is formed about an open area or cut-out area 24 of the relative flexible portion of the elastomer portion 16. Expandable loop 22 may be sized and shaped to provide sufficient expansion so expandable loop 22 can be secured about (i.e., stretched over) various articles or products depending upon the desired application or use. Alternatively, expandable loop 22 may be sized and shaped to extend around a package that tag portion 14 is adhered to with adhesive layer 18 (shown, e.g., as shaded area 18 in FIG. 2). As discussed below, this allows attachment tag to hold the package closed between uses.

Although expandable loop 22 is illustrated in FIGS. 1 and 2 with a particular loop shape or design, attachment tag 12 is not limited to the particular shape or design shown. For example, expandable loop 22 can be oval, round or elongate shape depending upon the desired application and characteristics of elastomer portion 16 (e.g., elasticity), the width of the loop band, the size of open area 24, and the like.

The size, shape and dimensions of the expandable loop 22 desirably permit stretching of the loop to a size at least three times greater than a relaxed unstretched size. The relaxed unstretched opening may range from as little as about 1.5 inches up to illustratively 5 inches. In an illustrative embodiment, a width of a perimeter of the expandable loop 22 is in a range of about 1/10 inches (100 mils) to about 1/12 inches (50 mils) and a thickness of the expandable loop 14 is between about 0.012 inches (12 mils) and about 0.030 inches (30 mils).

As shown, the relatively flexible portion of elastomer portion 16 also includes transition portion 26 disposed between bonding segment 20 and expandable loop 22. Accordingly, transition portion 26 extends from bonding segment 20, and expandable loop 22 extends from transition portion 26. Thus, expandable loop 22 is spaced apart from bonding segment 20 by transition portion 26. In some embodiments, transition portion 26 may include a neck portion 28 and shoulders 30 having a top edge 31 that function to disperse tension force created as a result of the stretching or expansion of expandable loop 22.

For example, when expandable loop 22 is stretched, this generates tension forces on elastomeric portion 14 (see e.g., stretched expandable loop 22 as shown below in FIG. 7). Transition portion 26 disperses the tension forces, which is desirable to reduce stress on the elastomer in bonding segment 20. The dimension and contour of the transition or neck portion 28 may be designed based upon the size, shape and elastic characteristics of the expandable loop 22. Together, bonding segment 20, transition portion 24 and neck portion 28 may be considered to be a "layer portion" of attachment tag 10 that is co-extensive with expandable loop 22. In an exemplary embodiment, tag portion 14 is attached to elastomer portion 16 only along bonding segment 20.

Figure 3:
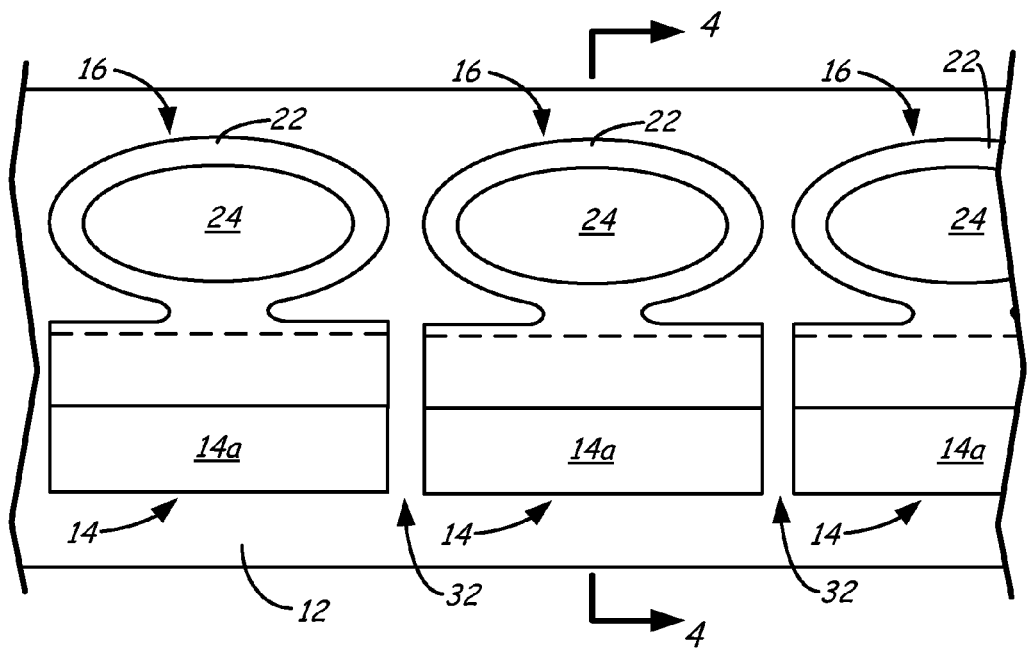
FIG. 3 is a front view of a plurality of first embodied attachment tags disposed on a liner.
Figure 4:
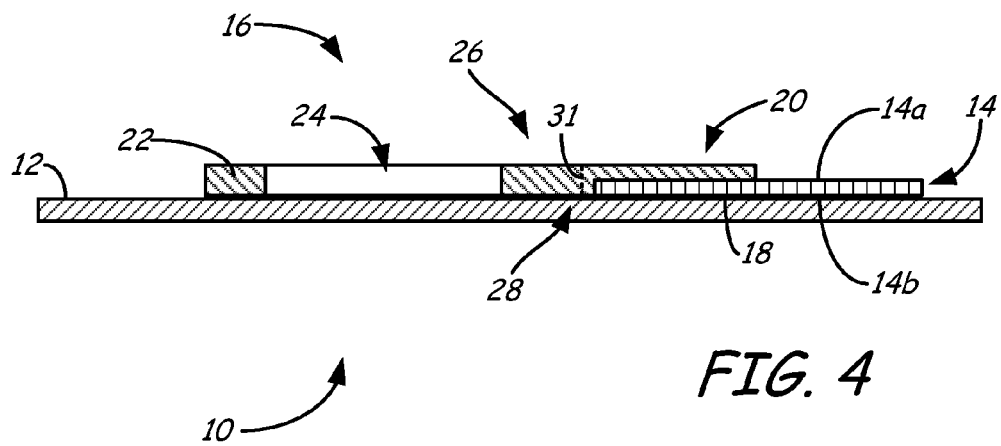
FIG. 4 is a sectional view taken along section 4-4 in FIG. 3.

As show in FIG. 2, adhesive layer 18 is applied over one or more portions of second face 14b. Adhesive layer 18 may be used to adhere tag portion 14 to a retail product, as discussed below. Additionally, as shown in FIGS. 3 and 4, adhesive layer 18 may also be used to secure tag portion 14 to liner 12 (shown in FIGS. 2 and 3) such that multiple attachment tags 10 may be provided from a single strip or roll of liner 12. Examples of suitable adhesives include pressure sensitive adhesives (PSAs) (e.g. hot-melt PSAs), such as those based on acrylic monomers and polymers (e.g., bio-based acrylates), block copolymer rubber adhesives, silicone rubber adhesives, and the like, which may optionally include one or more additional tackifying resins.

Liner 12 is a release liner or other suitable carrier web that is configured to releasably retain attachment tags 10 via adhesive layers 18. Liner 12 may be fabricated from a paper and/or polymeric web (e.g., a polyolefin and/or polyethylene terephthalate web) coated with one or more release agents (e.g., a silicone release coating). In the embodiment shown in FIG. 3, adjacent attachment tags 10 are spaced apart from each other along liner 12 to form discrete attachment tags 10 that can be easily removed from liner 12. In this embodiment, the tag portion 14 and elastomer portion 16 of each adjacent attachment tags 10 are separated from each other by spaces 32, each having a suitable distance for easy removal of attachment tags 10 from liner 12.

During manufacturing, adhesive layer 18, a web of tag portion 14, and a web of elastomer portion 16 may be extruded onto liner 12. The spacings 32 between adjacent attachment tags 10 may be achieved by a "kiss cut" treatment of the attachment tag components on liner 12 to separate the attachment tags 10 yet retain them on liner 12. Such cutting is particularly suitable when each attachment tag 10 is removed from liner 12 and adhered by adhesive layer 18 to a product or package automatically, such as by use of a label applicator or labeling machine. The kiss cuts result in cut spaces 32 that extend through the thickness of each attachment tag 10 but do not cut through liner 12. In this embodiment, tag articles 10 are disposed on liner 12 as discrete articles that do not touch each other, and a waste strip of tag and elastomer materials may be removed from the cut locations and recycled. The resulting liner 12 with multiple attachment tags 10 may then be provided as a sheet, or alternatively, as shown in FIG. 5, a rolled configuration.

Figure 5:
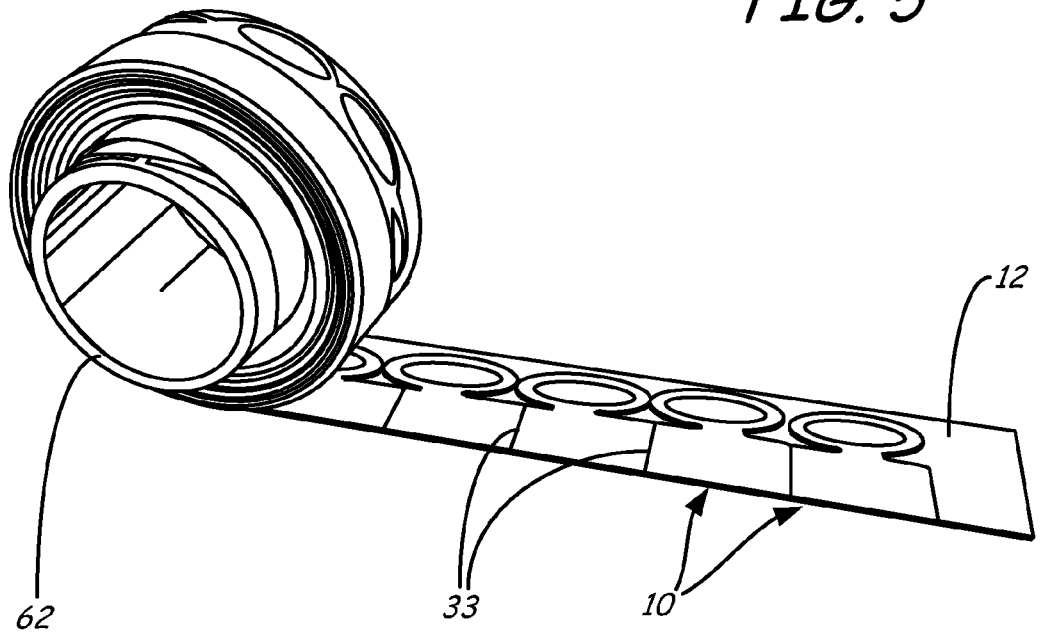
FIG. 5 is a perspective view of a plurality of first embodied attachment tags on a liner in a rolled configuration.

In an alternative embodiment, such as shown in FIG. 5, attachment tags 10 may be bound together by perforations 33 along the tag portions 14 and/or the elastomer portions 16. Furthermore, many configurations of attachment tags 10 are possible. For example, while attachment tags 10 shown in FIGS. 1-4 have tag portions 14 and elastomer portions 16 that are approximately the same width, tag portion 14 may alternatively be wider or narrower than elastomer portion 16. Moreover, attachment tags 10 may be asymmetrical. Additionally, the elastomer portion 16 of one attachment tags 10 may extend over the tag portion 14 of an adjacent attachment tags 10, or vice versa. Further, it is contemplated that a plurality of attachment tags 10 provided as a roll or on a liner need not be identical to each other in shape; that is, a pattern of differently shaped tag articles may be provided in a single manufacturing run.

Figure 6:
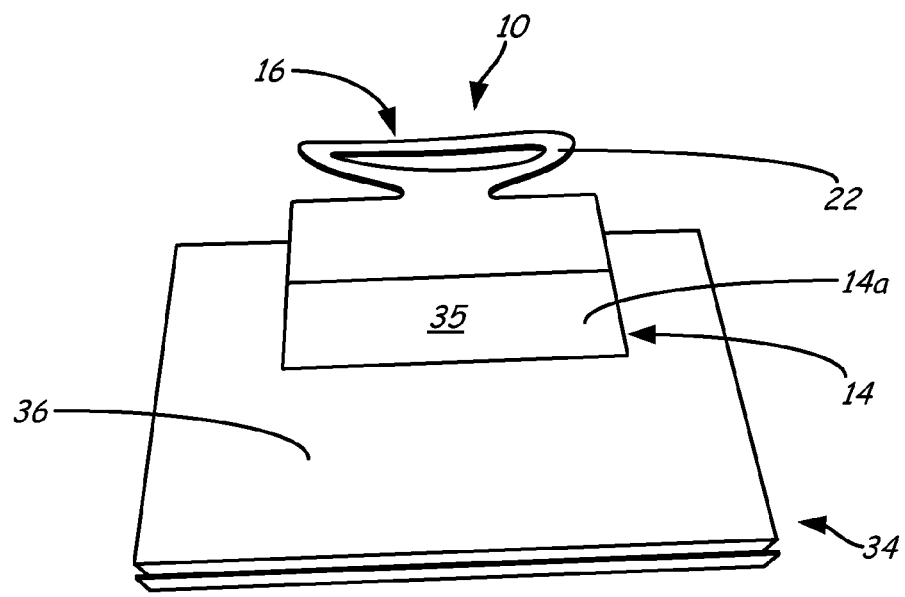
FIG. 6 is a rear view of the first embodied attachment tag affixed to a sample product.

During use, an attachment tag 10 may released and removed from liner 12, and adhered to a retail product. For example, as shown in FIG. 6, tag portion 14 of an attachment tag 10 may be adhered to a sample product 34 by adhesive layer 18. Because adhesive layer 18 is applied to second face 14b, and desirably not to elastomer portion 16, the adhesion interface between attachment tag 10 and sample product 34 does not interfere with the ability of elastomer portion 16 to stretch. In addition, any portion of first face 14a of tag portion 14 that is not covered by bonding segment 20 is exposed and may bear indicia, such as on exposed portion 35 of first face 14a, as seen in FIG. 6.

Figure 7:
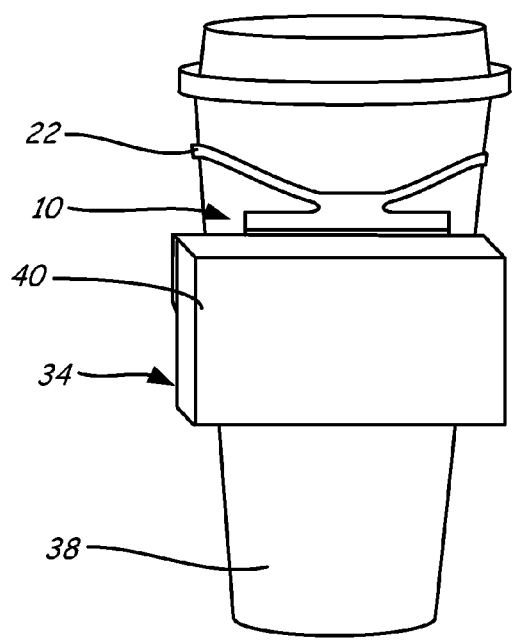
FIG. 7 is a front view of the first embodied attachment tag and sample product attached to a primary product.

As shown in FIG. 7, attachment tag 10 and the adhered sample product 34 may be attached to a primary product, such as primary product 38. In this situation, expandable loop 22 is attached to primary product 38 by stretching expandable loop 22 around a portion of product 38. As illustrated, attachment tag 10 may be adhered to a back side 36 of sample product 34 such that when expandable loop 22 is attached to a primary product 38, a front side 40 of sample product 34 is visible to a consumer, and tag portion 14 may then be inconspicuous without further manipulation of sample product 34 relative to product 38. In the illustrated embodiment, attachment tag 10 is used in conjunction with sample product 34 as a sample carrier for easily and detachably attaching a sample product 34 to a primary product 38.

Figure 8:
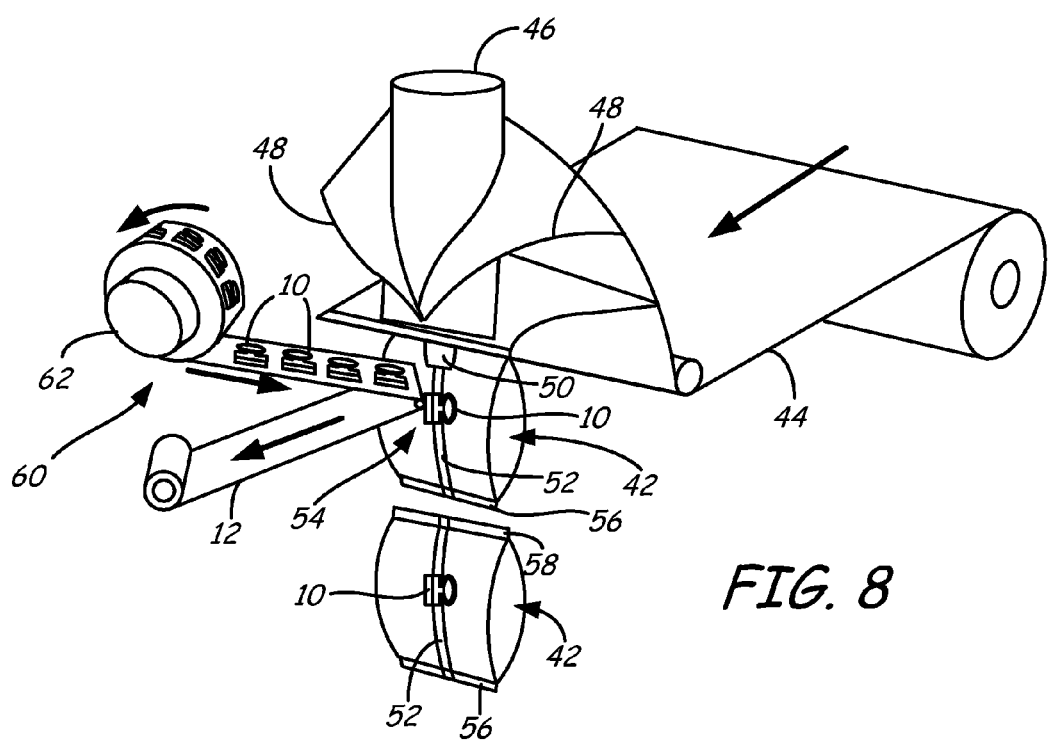
FIG. 8 is a perspective view of an exemplary manufacturing set-up for forming a plurality of packages, each package provided with a first embodied attachment tag adhered thereto.
Figure 9A:
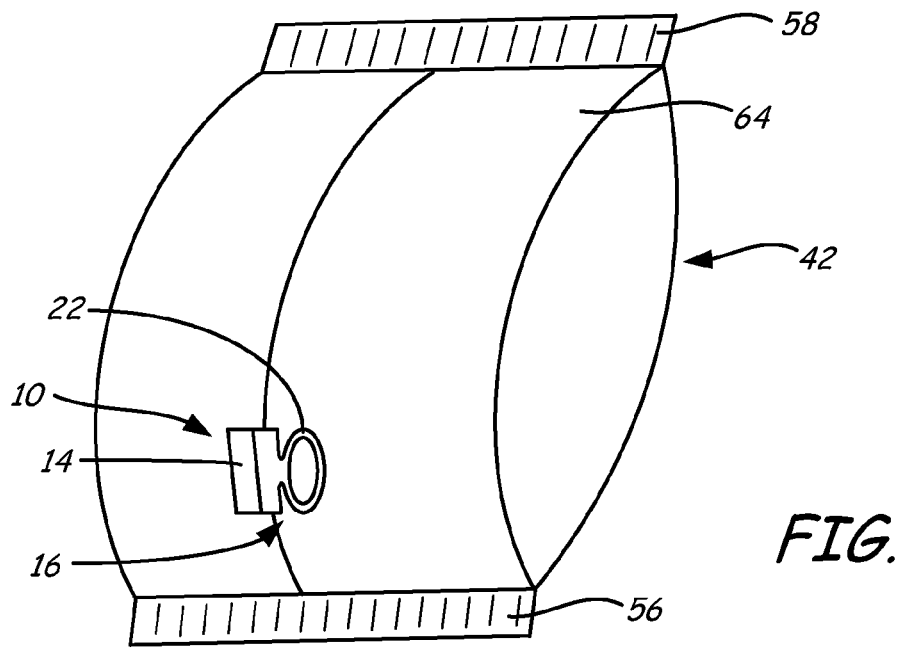
FIG. 9A is a perspective view of one of the formed packages with the adhered first embodied attachment tag.
Figure 9B:
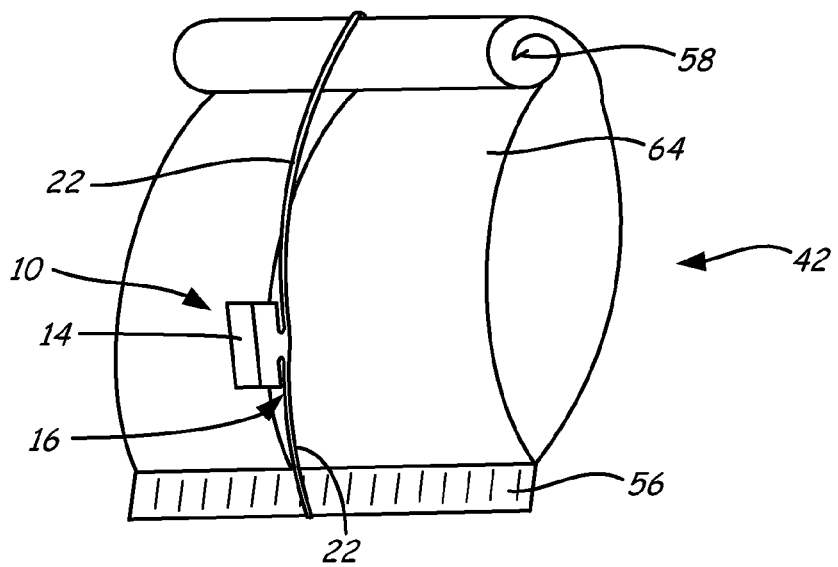
FIG. 9B is a perspective view of the package in a rolled, reclosed configuration using the first embodied attachment tag.

As discussed above, attachment tag 10 may also be used as a reclosure device for a flexible container such as a food bag or package, such as for a package 42 shown in FIGS. 8 and 9A and 9B. For example, as shown in FIG. 8, attachment tags 10 may be attached to packages 42 during the assembly and filling of packages 42, where the attachment tags 10 may then function as reclosure devices during subsequent consumer use of packages 42.

As shown, a series of packages 42 may be formed from a continuous length of a flexible sheet material 44 (e.g., a polymeric and/or foil-based materials having one or more layers). The sheet material 44 is drawn past a hollow mandrel 46 so that edges 48 of sheet material 44 are brought together into overlapping relation. The overlapped edges 48 are joined together as they pass under or through heater 50 in a continuous longitudinally extending seam 52 to form tubular member 54.

The distal end of tubular member 54 is sealed with a bottom transverse seam 56 to form an open-ended package 42 having its open mouth wrapped around the hollow mandrel 46. The package can then be filled with product (e.g., food such as potato chips or sunflower seeds, or small items such as screws, washers, etc.) through mandrel 46. After filling, the top of the package 42 is sealed with a top transverse seam 58. The filled and sealed package 42 is severed from the sheet of material 44.

In the shown embodiment, a label applicator 60 bears a roll 62 of attachment tags 10 adhered to liner 12, as discussed above. Label applicator 60 may apply a single attachment tag 10 to each package 42 as it is formed, and the attachment tag 10 is fixed to the package 42 by adhesive layer 18. In alternative embodiments, label applicator 60 may apply multiple attachment tags 10 to each package 42, if desired, such that each package 42 desirably retains one or more attachment tags 10.

In an exemplary embodiment, attachment tag 10 is applied to package 42 at or near longitudinal seam 52 on a back side of package 42. This central placement is least likely to obscure printed information on package 42 and facilitates ease of use of attachment tag 10 as a reclosure device for package 42. In another embodiment, attachment tags 10 may be applied in specified locations on sheet material 44 before the sheet material 44 is formed into packages 42. The flatness of tag article 10 allows it to readily flow through the bag formation processing equipment without requiring special accommodations. Alternatively, a attachment tag 10 may be adhered to a package 42 after the package 42 has been formed and/or formed and filled.

FIGS. 9A and 9B are perspective views of package 42 having an attachment tag 10 adhered thereto. As shown in FIG. 9A, during use, package 42 is typically opened at or near top transverse seam 58. With many products, a user does not use the entire contents of package 42 at one time. Thus, it is desirable to reclose package 42. In one embodiment, package 42 may be reclosed by rolling down or folding over a top portion 64 of package 42, as shown in FIG. 9B. The user may then stretch expandable loop 22 of elastomer portion 16 of attachment tag 10 around package 42 to secure package 42 in its rolled/folded and reclosed configuration, as shown in FIG. 9B. When access to the contents of the package 42 is again desired, the expandable loop 22 may then be removed from about the package 42, yet is readily available for reuse and closure since it remains affixed to the package via adhesive layer 18 on tag portion 14.

In alternative embodiments, adhesive layer 18 may be adhesive to liner 12, but otherwise non-adhesive after removal from liner 12. For example, adhesive layer 18 may include a fugitive glue (e.g., a silicone coat fugitive glue) rather than a pressure sensitive adhesive where the fugitive glue may function as a low-tack adhesive that produces a removable, non-resealable joint. A fugitive glue allows attachment tags 10 to be maintained on liner 12 for further processing; however, adhesive layer 18 is not tacky once tag article 10 is removed from liner 12. Thus, in this embodiment, adhesive layer 18 is tacky for coupling to liner 12, but is no longer tacky when removed from line 12.

In an exemplary method of use, a roll 62 can be used in an automated process that removes an individual tag article 10 from carrier liner 12 and secures expandable loop 22 around a product. For example, a tag article 10 bearing product information on tag portion 14 can be machine-applied to a bottle of product by an automated process that places expandable loop 22 around the neck of the product bottle. Moreover, even when it is not necessary that tag article 10 be adhered to a product, providing tag articles 10 temporarily adhered to liner 12 allows the elastomer portions 16 of tag articles 10 to be maintained in a flat configuration, thereby facilitating easy spooling of the tag articles 10. Other methods of temporary adhesion include the use of static electricity or the use of inherent affinity of an extruded elastomer onto a smooth liner, for example.

Figure 10:
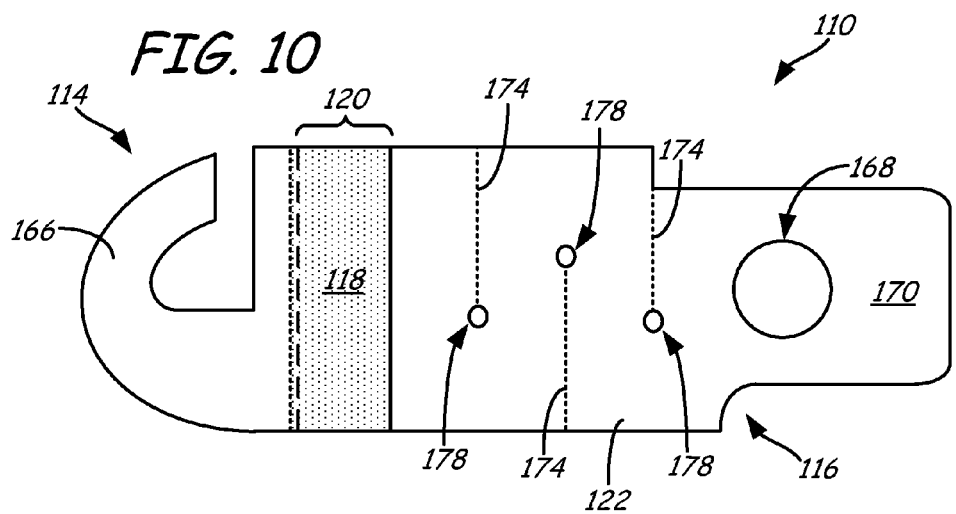
FIG. 10 is a rear view of a second embodied attachment tag of the present disclosure.
Figure 11:
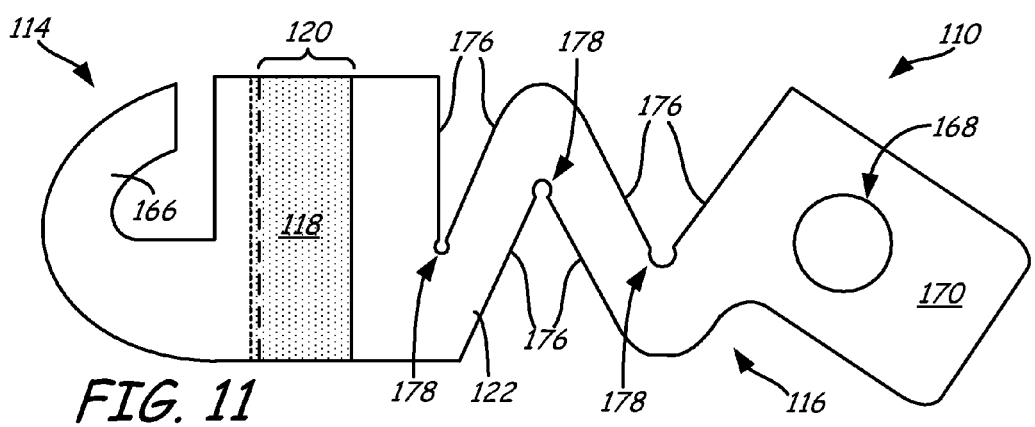
FIG. 11 is a rear view of the second embodied attachment tag with sections of the elastomer portion separated and stretched out along a plurality of lines.
Figure 12:
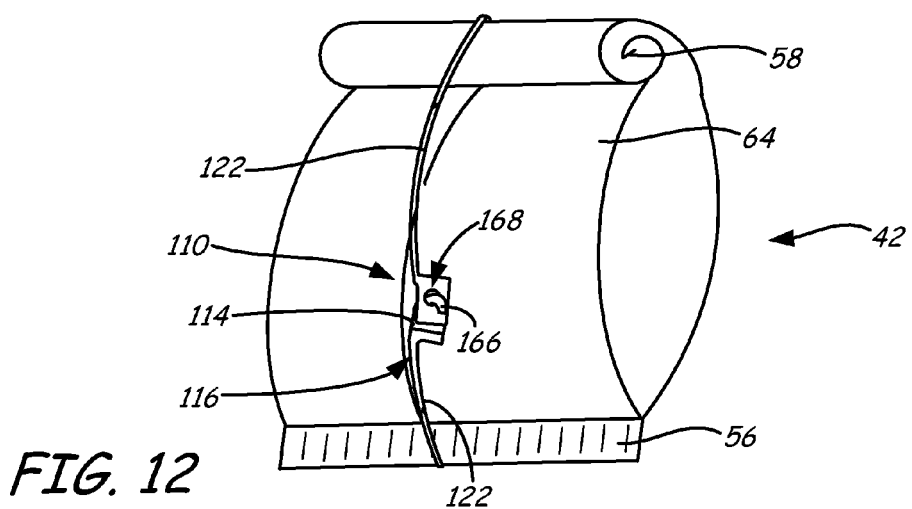
FIG. 12 is a perspective view of a rolled and reclosed package using the second embodied attachment tag.

FIGS. 10-12 show a second exemplary embodiment of an attachment tag that may function as a reclosure device for package 42, referred to as attachment tag 110. Attachment tag 110 is similar to attachment tag 10 (shown in FIGS. 1-9B), where reference numbers of the respective features are increased by "100" from those of attachment tag 10.

Attachment tag 110 includes a tag portion 114 attached to an elastomer portion 116 at bond zone or bonding segment 120. In an exemplary embodiment, tag portion 114 is made of materials such as those disclosed above with reference to tag portion 14. Moreover, in an exemplary embodiment, elastomer portion 116 is made of materials such as those disclosed with respect to elastomer portion 16 above. Construction of attachment tag 110 can be similar to that of tag article 10, with a primary difference being in the configurations of the tag portion 114 compared to tag portion 14 and of elastomer portion 116 compared to elastomer portion 16. Attachment tag 110 may be secured to a package 42 in the same manner as described above for attachment tag 10 to package 42, using adhesive layer 118, for example.

As shown in FIG. 10, tag portion 114 includes hook 166 and elastomer portion 116 includes hook engaging aperture 168 and tab 170. Elastomer portion 116 is relatively compact but can be expanding lengthwise by pulling tab 170 in direction 172 (relative to tag portion 114) to break or separate elastomer portion 116 along separation lines 174, thereby revealing new edges 176, as shown in FIG. 11.

Separation lines 174 may be formed in any suitable matter to provide weakened or partially cut lines or curves that can be easily separated. Examples of suitable forms include the use of perforations, including those comprising relatively long cut sections and relatively short uncut sections; or use of a cut partially through the thickness dimension of elastomer portion 116, for example. In the shown embodiment, separation lines 174 end in rounded termini 178, which may be kiss cut from elastomer portion 116 to prevent unintentional tearing of elastomer portion 116 beyond separation lines 174.

As shown in FIG. 12, when attachment tag 110 is provided on a package 42, a user may reclose the package by rolling down or folding over top portion 64, pulling tab 170 to expand elastomer portion 116, stretching expandable portion 122 around package 42, and securing hook engaging aperture 168 on hook 166. Thus, attachment tag 110 provides a compact and low-profile structure attachable to package 42 that can be expanded to easily, securely and reversibly reclose package 42. The configuration of attachment tag 110 shown in FIGS. 10-12 is particularly suitable for a larger package 42 where a simple expandable loop 22 of attachment tag 10, such as shown in FIGS. 9A-9C, would be so large that it may undesirably catch on other products. Moreover, attachment tag 110 can be designed to provide for a greater length of expandable portion 122, thereby not requiring as much stretching capability of the elastomeric. Although adherence of attachment tag 110 is disclosed in one embodiment (via, e.g., adhesive layer 118), attachment tag 110 can be employed to reclosed a package, such as illustrated in FIG. 12, without adhering tag portion 114 to the package.

Figure 13A:
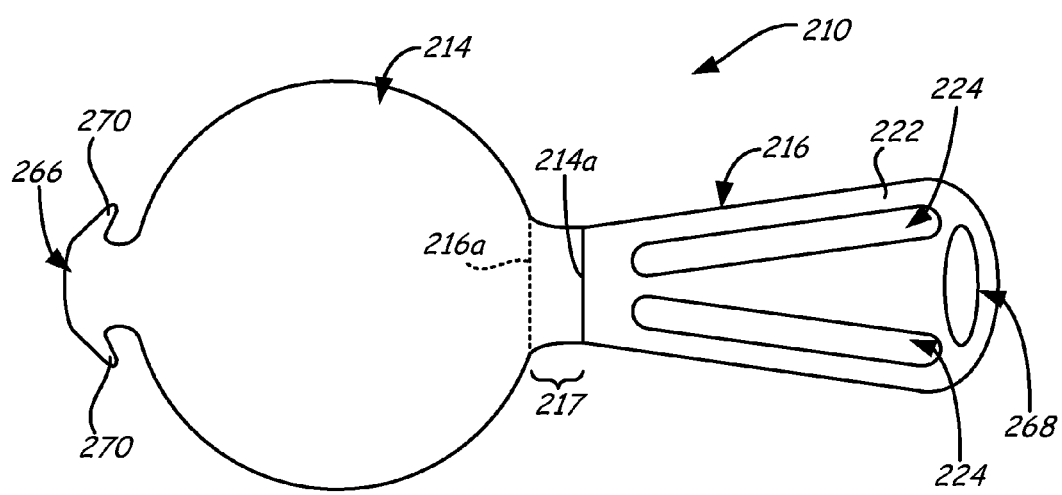
FIG. 13A is a top view of a third embodied attachment tag of the present disclosure.
Figure 13B:
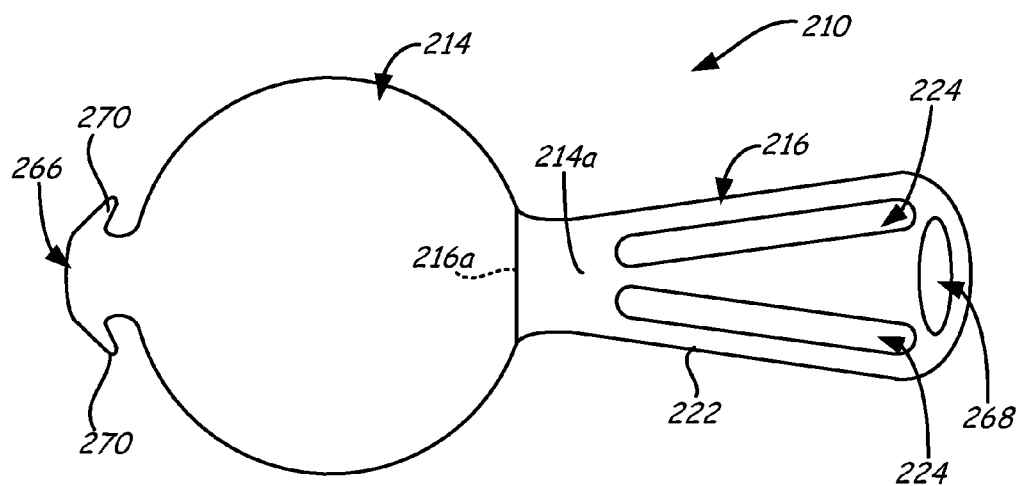
FIG. 13B is a bottom view of the third embodied attachment tag.

FIGS. 13A and 13B show top and bottom views of an exemplary embodiment of attachment tag 210, which comprises tag portion 214 and elastomer portion 216 joined at bond zone or bonding segment 217 (edge 216a of elastomer portion 216 and edge 214a of tag portion 214 are overlapped to define bond zone 217 therebetween). Tag portion 214 may be formed using the materials and methods discussed above with reference to tag portion 14 and elastomer portion 216 may be formed using the materials and methods discussed above with reference to elastomer portion 16. In the illustrated embodiments, tag portion 214 includes hook 266 and elastomer portion 216 includes hook engaging aperture 268.

As illustrated, in one embodiment, hook 266 is in the form of a truncated arrow, with barbs 270 on two sides. In the illustrated embodiment, tag portion 214 is substantially circular to compliment a circular product on which the tag is to be attached. However, it is understood that tag portion 214 may take on many other shapes and sizes. In the illustrated embodiment, expandable portion 222 of elastomer portion 216 includes product engaging slots 224. However, it is contemplated that other configurations of product engaging apertures, slits and slots may be used.

FIGS. 14A and 14B show top and bottom views, respectively, of a product 226 inserted into the product engaging slots 224 of expandable portion 222, where the elastomeric material about slots 224 is stretched about and grips the product 226. With product 226 thus inserted into slots 224 of tag article 210, tag portion 214 can be folded over or under product 226 so that hook 266 can be secured into hook engaging aperture 268. Information about product 226 may be provided on tag portion 214, such as by printing. Accordingly, in an exemplary embodiment, attachment tag 210 provides an informational packaging apparatus for a product that is easily attachable to and removable from the product 226 without requiring machinery, tools, or adhesives.

Figure 15:
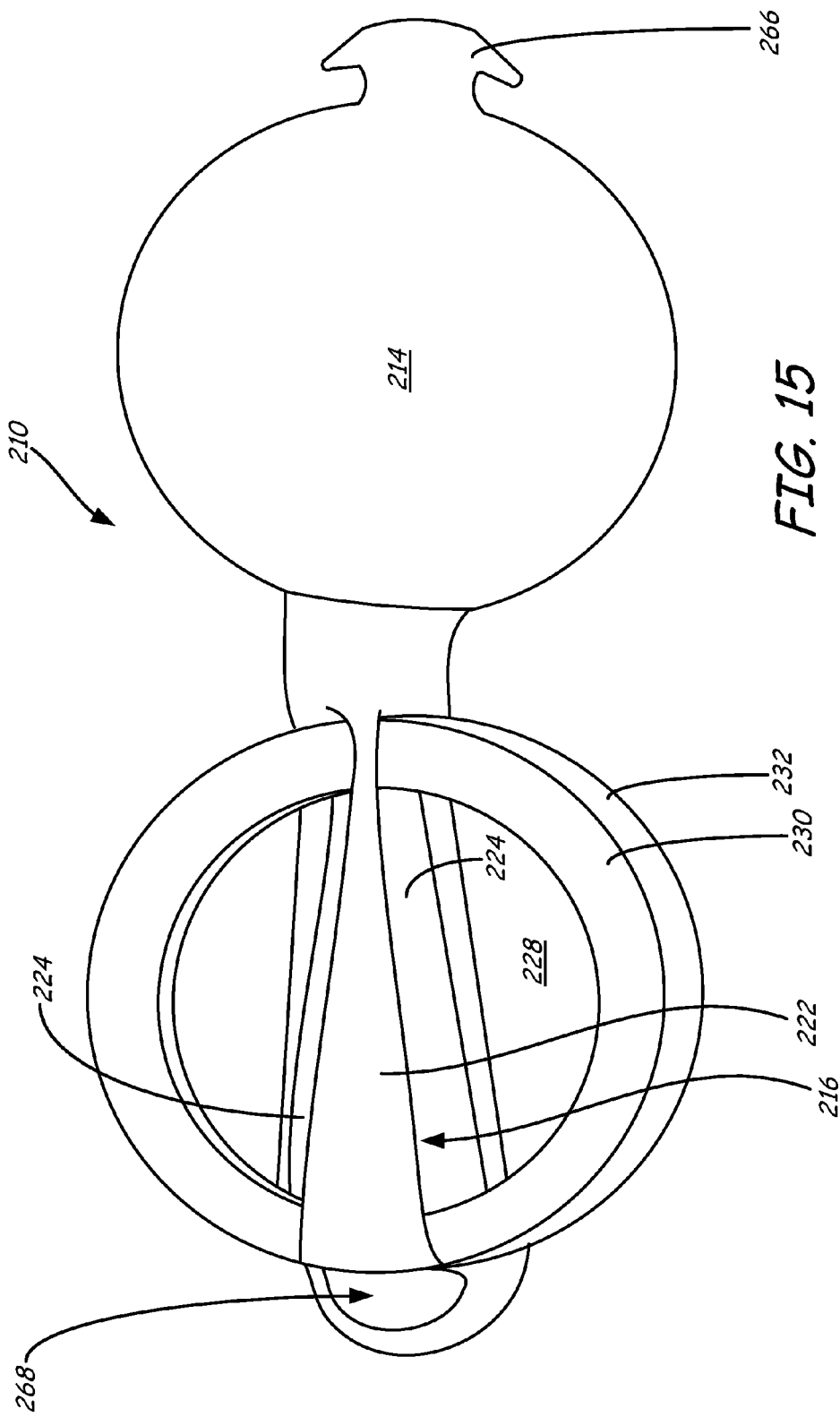
FIG. 15 is a top view of the third embodied attachment tag with a second object inserted into the slots thereof.
Figure 16:
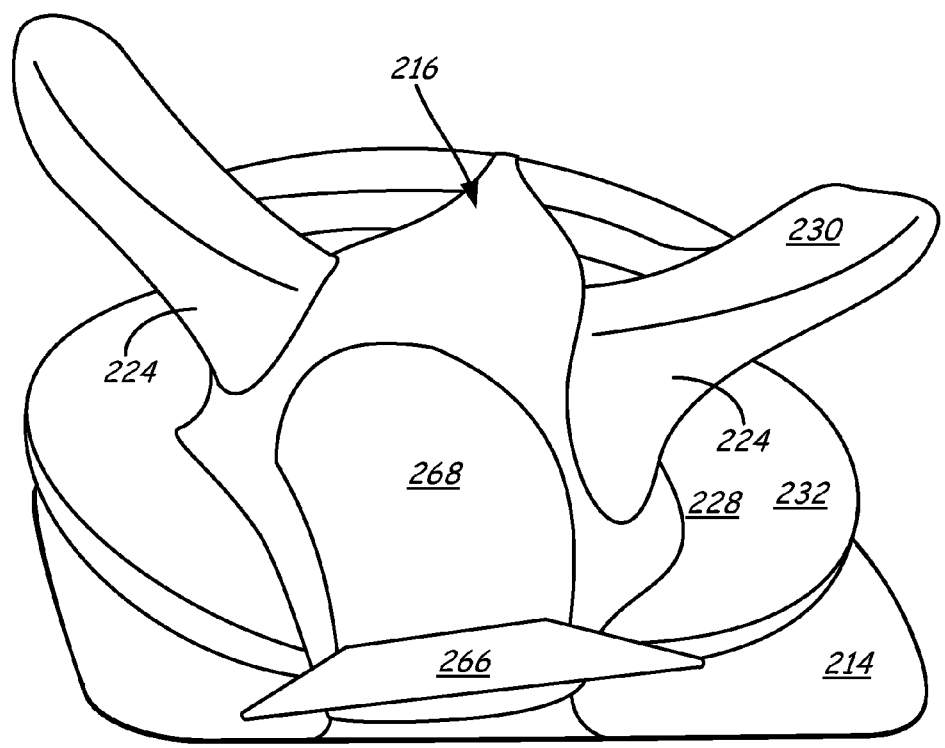
FIG. 16 is an end perspective view of the third embodied attachment tag and second object, with a tag portion of the attachment tag wrapped around the object and a hook of the tag portion engaged in a hook engaging aperture of the elastomer portion.

FIGS. 15 and 16 show the use of tag article 210 with a different product 228, which includes an upper portion 230 and a lower portion 232. In an exemplary method of inserting product 228 into expandable portion 222 of attachment tag 210, upper portion 230 of the product 228 is inserted through product engaging slots 224 so that expandable portion 222 stretches above upper portion 228 and between upper portion 230 and lower portion 232. Thereafter, tag portion 214 is folded below lower portion 232. Hook 266 engages hook engaging aperture 268, as shown in FIG. 16, to fully secure attachment tag 210 to product 228 and position tag portion 214 for display of indicia borne thereon.

Figure 17:
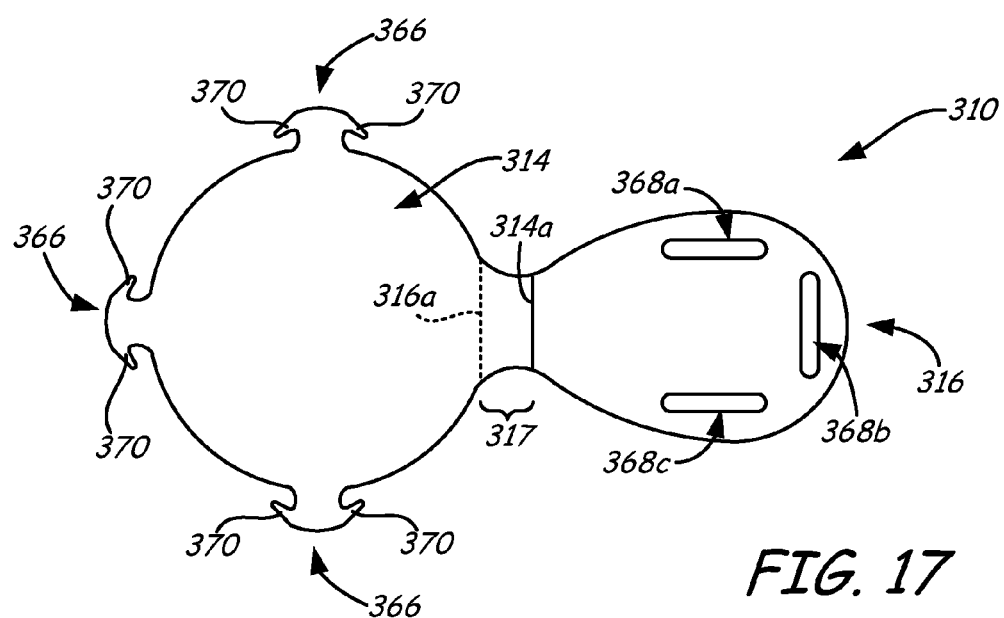
FIG. 17 is a top view of a fourth embodied attachment tag of the present disclosure.

It is contemplated that a tag article may have two or more hooks and two or more corresponding hook engaging apertures, arranged in a variety of manners on a tag portion and elastomer portion, respectively, to allow for more affirmative engagement of the tag article with a product. For example, FIG. 17 shows a top view of another exemplary embodiment of attachment tag 310, which comprises tag portion 314 and elastomer portion 316 joined at bond zone or bonding segment 317 (edge 316a of elastomer portion 316 and edge 314a of tag portion 314 are overlapped to define bond zone 317 therebetween).

Tag portion 314 may be formed using the materials and methods such as those discussed above with reference to tag portion 14 and elastomer portion 316 may be formed using the materials and methods such as those discussed above with reference to elastomer portion 16. In the illustrated embodiment, tag portion 314 includes three hooks 366 and elastomer portion 316 includes three hook engaging apertures 368. As illustrated, each of hooks 366 is in the form of a truncated arrow, with barbs 370 on two sides. In the illustrated embodiment, tag portion 314 is substantially circular to compliment a circular product on which the tag is to be attached. However, it is understood that tag portion 314 may take on many other shapes and sizes.

In one use, attachment tag 310 is wrapped around a product and elastomer portion 316 stretches to allow insertion of hook 366a into hook engaging aperture 368a, insertion of hook 366b into hook engaging aperture 368b, and insertion of hook 366c into hook engaging aperture 368c. Thus, in this embodiment, the product is not inserted into a slot of the elastomer portion 316 but rather is held between the tag portion 314 and the elastomer portion 316. While three hook and hook engaging apertures are shown, it is contemplated that other numbers and configurations of hooks and hook engaging apertures may be used.

FIGS. 18A-29 illustrate additional embodiments of the attachment tag of the present disclosure, which may function in a similar manner to attachment tags 10 and 110 (shown in FIGS. 9A-12), and where corresponding reference numbers are increased by "400" from those of attachment tag 10 and by "300" from those of attachment tag 110. In these embodiments, the attachment tag may function as an elastic band, such as disclosed in Maltas et al., U.S. Pat. No. 7,763,135.

FIGS. 18A-18C illustrate attachment tag 410, which includes tag portion 414 having a band-shaped configuration with first face 414a (shown in FIG. 18B) and second face 414b (shown in FIG. 18C), and elastomer portion 416 also having a band-shaped configuration, and which disposed over first face 414a of tag portion 414. Examples of suitable materials for tag portion 414 and elastomer portion 416 include those discussed above for tag portion 14 and elastomer portion 16.

As shown in FIG. 18A, elastomer portion 416 is bonded to first face 414a of tag portion 414 at bond zones or bonding segments 420, which are located at end regions 480 of tag portion 414 and elastomer portion 416 (illustrated by cross hatching). However, at a central region 482 of first face 414a between these end regions 480, first face 414a is desirably coated with one or more release agents (e.g., a silicone release agent, referred to as release coating 484) to prevent elastomer portion 416 from fixedly adhering to first face 414a at this central region, as discussed in Maltas et al., U.S. Pat. No. 7,763,135.

As further shown in FIG. 18A, elastomer portion 416 is relatively compact but can be expanded lengthwise by separating elastomer portion 416 from tag portion 414, and to separate elastomer portion 416 along separation lines 474, thereby revealing three consecutive leg segments 486a-486c in a switchback arrangement, as illustrated in FIGS. 18A and 18B. Separation lines 474 are desirably fully cut lines to separate elastomer portion 416 into consecutive leg segments 486a-486c, and may also define small gaps between the adjacent leg segments 486a-486c.

The weak bonding of elastomer portion 416 to release layer 484 of tag portion 412 retains leg segments 486a-486c in place prior to use (such as seen in FIG. 18A), while also allowing leg segments 486a-486c to be readily pulled apart from tag portion 414 without excessive pulling forces. Furthermore, as illustrated in FIG. 18B, leg segments 486a and 486c remain integrally connected to the remainder of elastomer portion 416 bonded to tag portion 414 at bonding segments 420. This keeps leg segments 486a-486c secured to tag portion 414 when they are separated and stretched.

In alternative embodiments, separation lines 474 may be formed with lines of weakness (e.g., perforated lines), as discussed above for separation lines 174 of attachment tag 110. In either embodiment, separation lines 474 desirably end in rounded termini 478, which may be kiss cut with separation lines 474 from elastomer portion 416 to prevent unintentional tearing of elastomer portion 416 beyond separation lines 474. Separation lines 474 and rounded termini 478 are desirably kiss cut such that elastomer portion 416 is cut, but tag portion 414 (including release coating 484) are not cut.

Each leg segment 486 may have a suitable length, generally defined by the length of central region 482 between end regions 480. Examples of suitable lengths for each leg segment 486 (e.g., each of leg segments 486a-486c) may range from about 0.5 inches to about 5 inches. In some embodiments, Examples of suitable lengths for each leg segment 486 (e.g., each of leg segments 486a-486c) may range from about 1 inch to about 3 inches. Examples of suitable widths for each leg segment (transverse to its length) range from about 0.25 inches to about 1 inch. Leg segments 486a-486c may have the same lengths and widths, or alternatively, different lengths and widths based on the switchback pattern.

Figure 19:
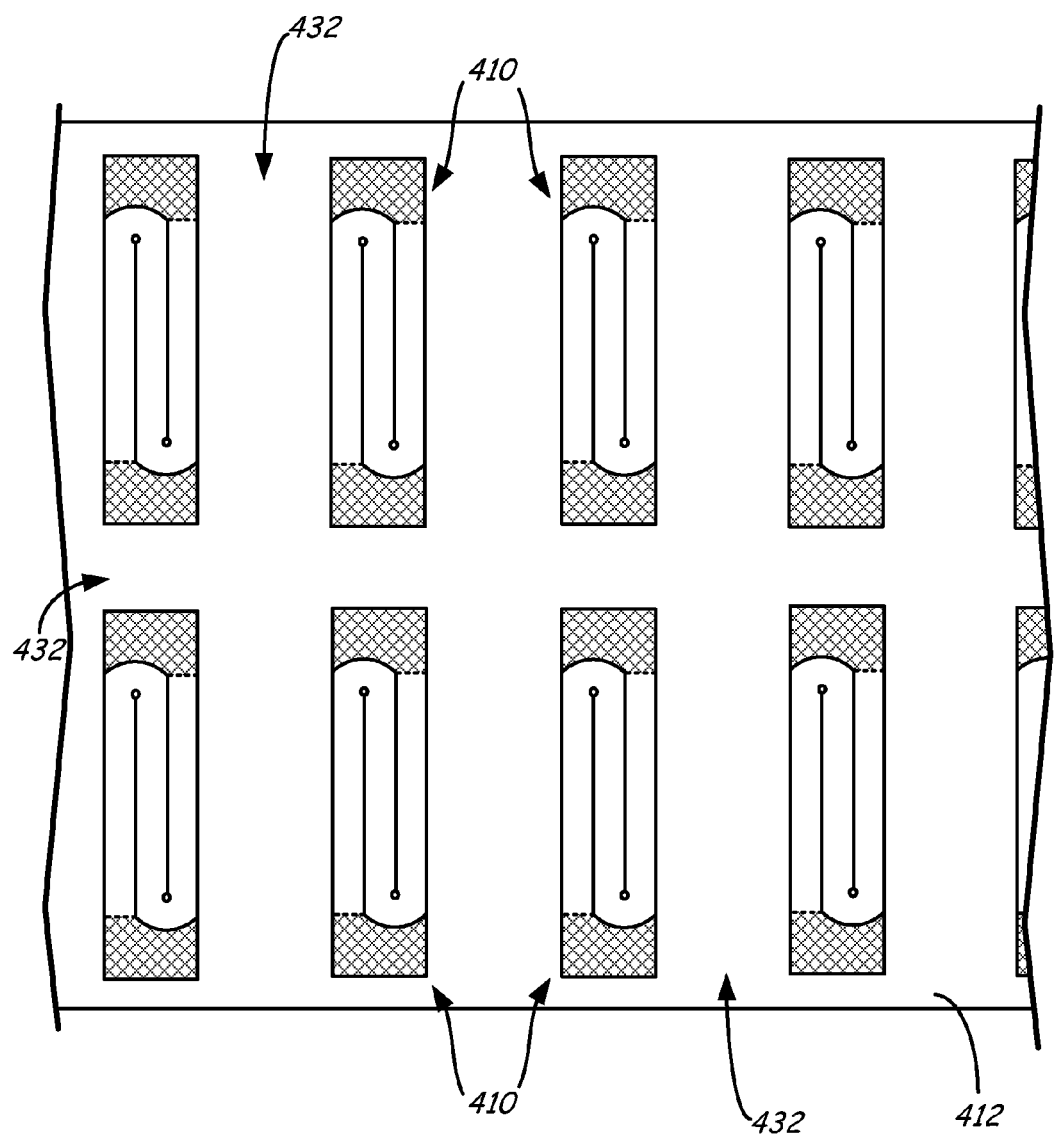
FIG. 19 is a front view of a plurality of fifth embodied attachment tags disposed on a liner.

As shown in FIG. 18C, one or more portions of second face 414b of tag portion 414 may be coated with adhesive layer 418, which may include the same materials as discussed above for adhesive layer 18. Adhesive layer 418 may be used to adhere tag portion 414 to an item or a retail product, and/or (as shown in FIG. 19) may also be used to secure tag portion 414 to liner 412 such that multiple attachment tags 410 may be provided from a single strip or roll of liner 412, as discussed above for attachment tag 10 and liner 12.

Liner 412 is a release liner or other suitable carrier web that is configured to releasably retain attachment tags 410 via adhesive layers 418. Liner 412 may also be fabricated from a paper and/or polymeric web (e.g., a polyolefin and/or polyethylene terephthalate web) coated with one or more release agents (e.g., a silicone release coating). In the embodiment shown in FIG. 19, adjacent attachment tags 410 are spaced apart from each other along liner 412 to form discrete attachment tags 410 that can be easily removed from liner 412. In this embodiment, the tag portion 414 and elastomer portion 416 of each adjacent attachment tags 410 are separated from each other by spaces 432, each having a suitable distance for easy removal of attachment tags 410 from liner 412, as also discussed above for attachment tag 10 and liner 12.

During manufacturing, adhesive layer 418, a web of tag portion 414, a coating of a silicone release agent for release coating 484, and a web of elastomer portion 416 may be extruded or otherwise disposed relative to liner 12, where tag portion 414, release coating 484, and elastomer portion 416 may be manufactured in the same manner as discussed in Maltas et al., U.S. Pat. No. 7,763,135. The spacings 432 between adjacent attachment tags 410 may also be achieved by a kiss cut treatment of the attachment tag components on liner 412 to separate the attachment tags 410 yet retain them on liner 412.

Such cutting is particularly suitable when each attachment tag 410 is removed from liner 412 and adhered by adhesive layer 418 to a product or package automatically, such as by use of a label applicator or labeling machine. The kiss cuts result in cut spaces 432 that extend through the thickness of each attachment tag 410 but do not cut through liner 412. In this embodiment, tag articles 410 are disposed on liner 412 as discrete articles that do not touch each other, and a waste strip of tag and elastomer materials may be removed from the cut locations and recycled. The resulting liner 412 with multiple attachment tags 410 may then be provided as a sheet, or alternatively a rolled configuration.

FIGS. 20-26 illustrate alternative attachment tags 410, having different arrangements for leg segments 486 of elastomer portion 416, but otherwise may function in the same manner as attachment tag 410 shown in FIGS. 18A-18C and 19. As shown in FIG. 20, elastomer portion 416 of attachment tag 410 may alternatively include additional odd numbers of leg segments 486, such as five leg segments 486a-486e, which can provide a relatively larger and thinner loop when leg segments 486a-486e are separated and stretched.

As shown in FIG. 21, separation lines 474 may alternatively extend at angles relative to the length of attachment tag 410. This provides a different switchback arrangement from that of attachment tag 410 shown in FIGS. 18A-18C and 19, and increases the size of the integral connection between leg segments 486a and 486c with the bonding segments 420.

Figure 22:
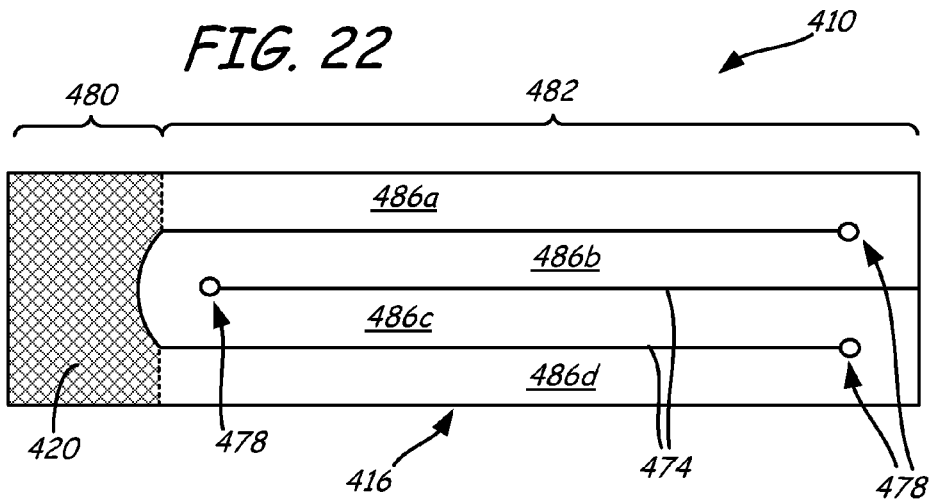
FIG. 22 is a front view of an eighth embodied attachment tag of the present disclosure, having a band-shaped tag portion and elastomer portion with four leg segments.

As shown in FIG. 22, in this embodiment, elastomer portion 416 includes an even number of leg segments 486a-486d (i.e., four leg segments 486), and attachment tag 410 only includes a single bonding segment 420. As such, elastomer portion 416 is bonded to tag portion 414 at only one end of attachment tag 410, as shown. Likewise, leg segments 486a and 486d are integrally connected to bonding segment 420 at this same end of attachment tag 410, and leg segments 486a-486d may extend to the entire other end of attachment tag 410. As discussed above, prior to separation, leg segments 486a-486d may be weakly bonded to release coating 484 in a releasable manner.

Figure 23A:
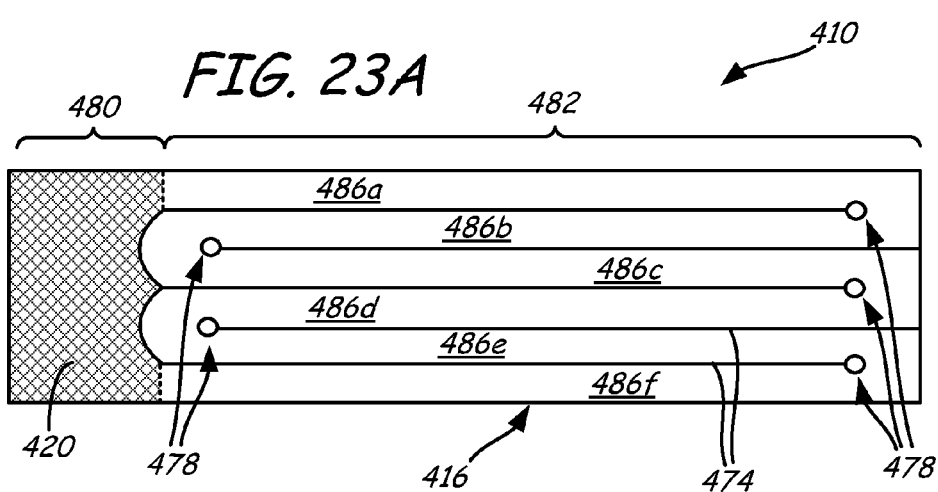
FIG. 23A is a front view of a ninth embodied attachment tag of the present disclosure, having a band-shaped tag portion and elastomer portion with six leg segments.
Figure 23B:
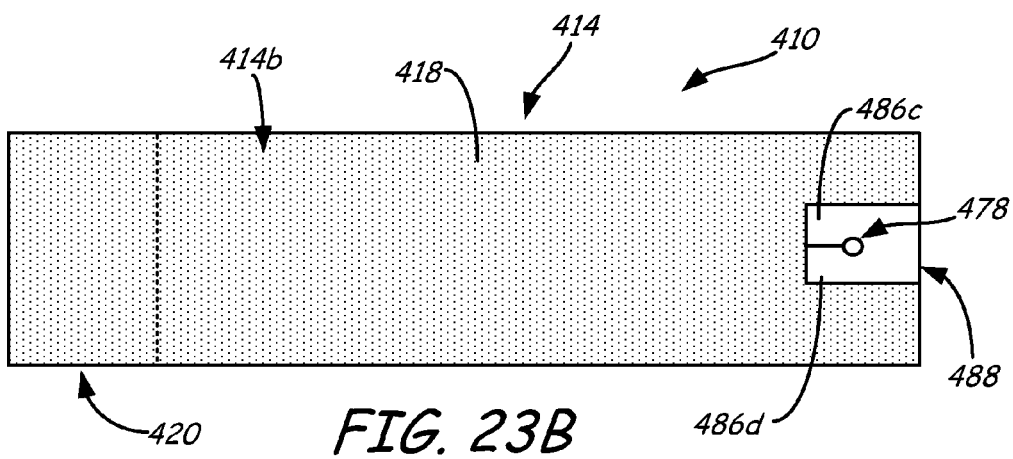
FIG. 23B is a rear view of the ninth embodied attachment tag.

As shown in FIGS. 23A and 23B, elastomer portion 416 of attachment tag 410 may also alternatively include additional (or fewer) even numbers of leg segments 486, such as six leg segments 486a-486f, which provide a relatively larger and thinner loop when leg segments 486a-486f are separated and stretched. Accordingly, elastomer portion 416 may include any suitable number of leg segments 486, where the number of leg segments 486 may dictate the expanded loop size of attachment tag 410. Examples of suitable numbers of leg segments 486 for attachment tag 410 range from two to ten, with particularly suitable numbers ranging from three to eight.

As shown in FIG. 23B, in embodiments in which elastomer portion 416 includes an even number of leg segments 486, tag portion 414 may be cut to define notch 488. Notch 488 provides easy access to leg segments 486 to allow a user to readily pull leg segments 486 apart from tag portion 414.

Figure 24A:
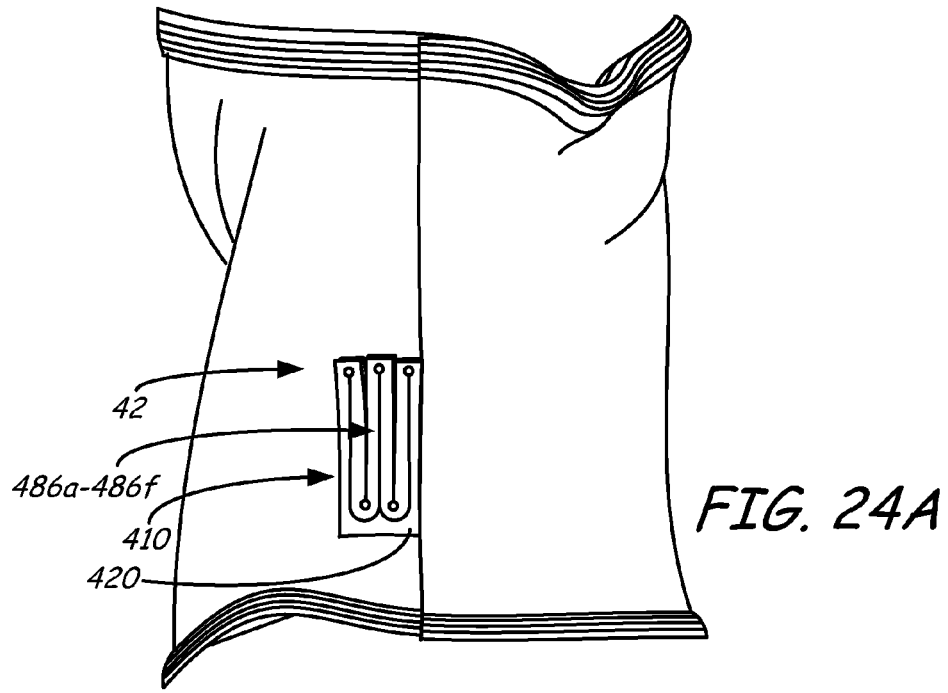
FIGS. 24A-24F are perspective views of the ninth embodied attachment tag affixed to a package, which illustrate a process for reclosing the package.
Figure 24B:
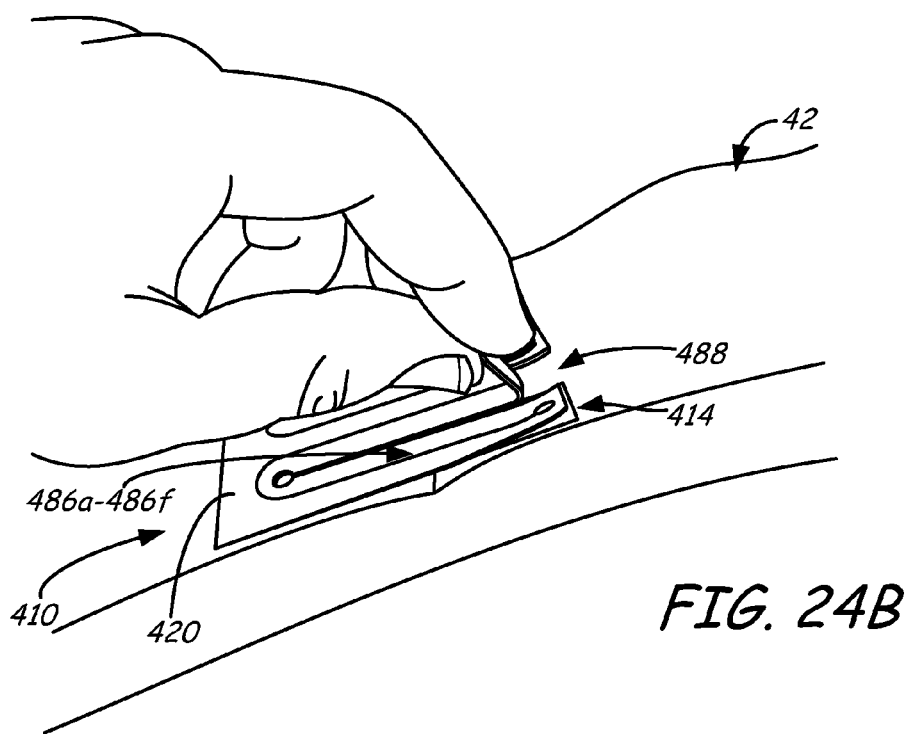
Figure 24C:
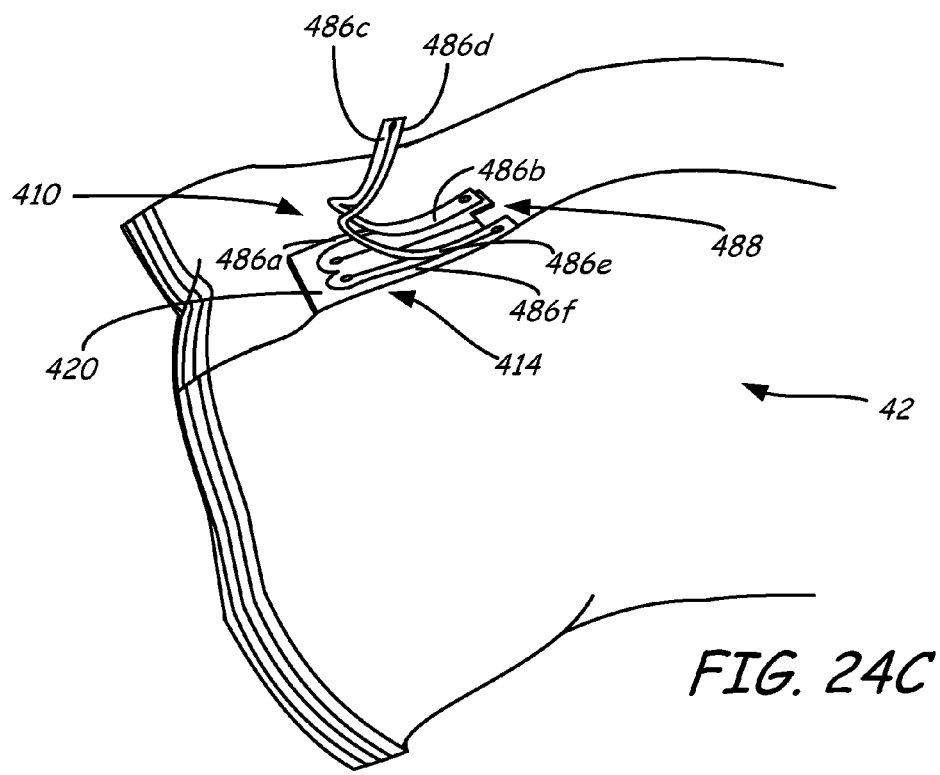

FIGS. 24A-24F illustrate an example process for using attachment tag 410 having six leg segments 486 (i.e., as shown in FIGS. 23A and 23B) with a package 42. As shown in FIG. 24A-24C, when attachment tag 410 is provided on a package 42, a user may reclose the package by rolling down or folding over a top portion of package 42, separating leg segments 486a-486f of elastomer portion 416 from tag portion 414, and enclosing package 42 within a loop that can be defined by the elastomer on tag portion 414 and leg segments 486a-486f.

Figure 24D:
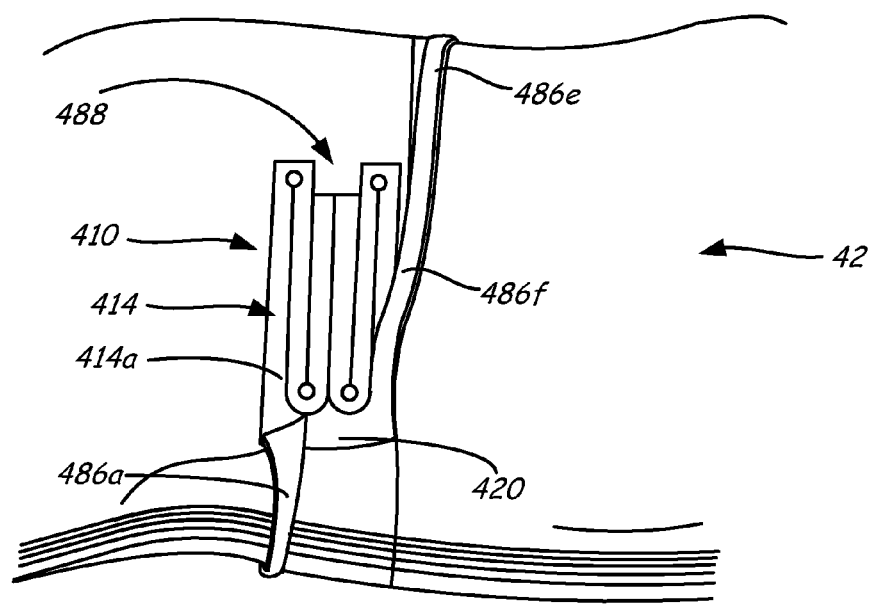
Figure 24E:
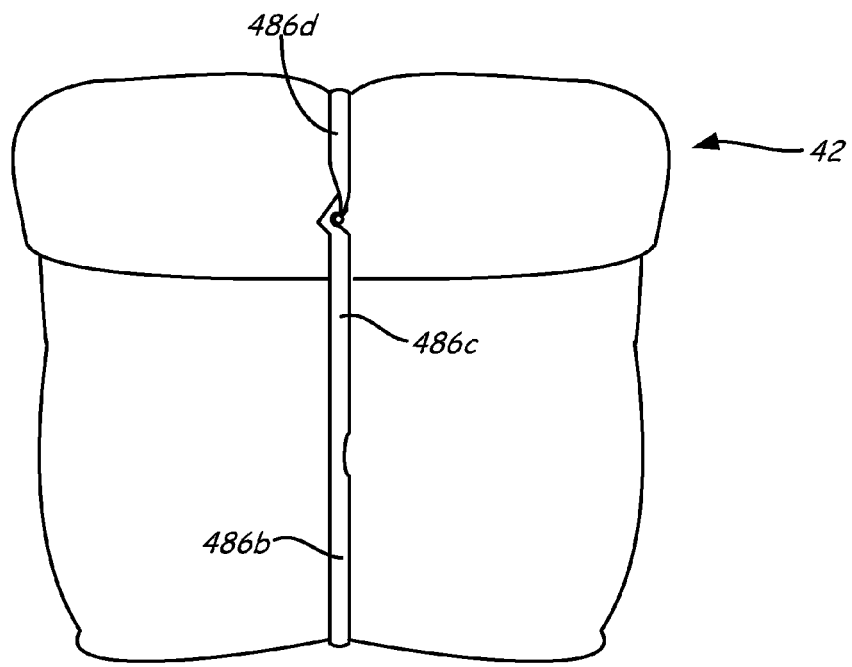
Figure 24F:
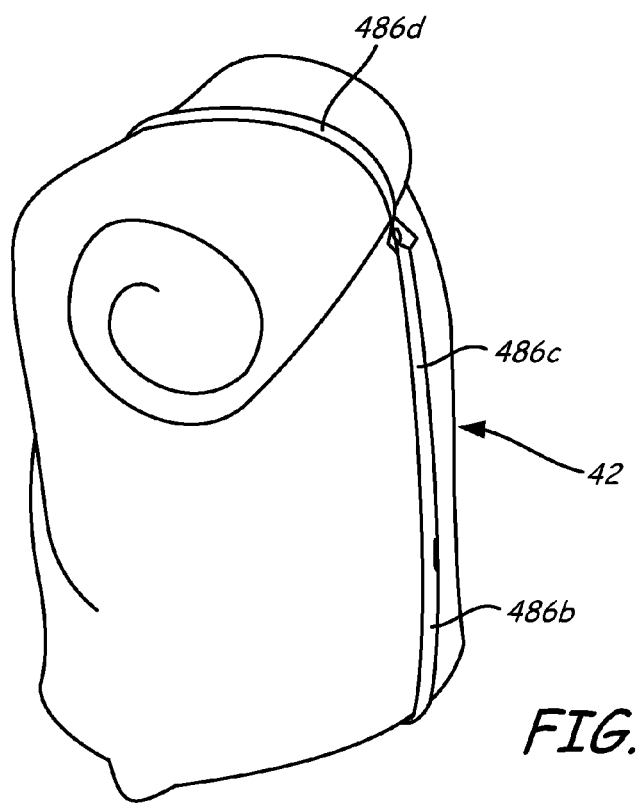

In particular, as shown in FIG. 24B, a user may grip leg segments 486c and 486d at the location of notch 448, and pull leg segments 486c and 486d away from tag portion 414. As shown in FIG. 24C, as the user continues to pull leg segments 486c and 486d away from tag portion 414, the switchback arrangement of leg segments 486a-486f accordingly cause leg segments 486b and 486e, and then leg segments 486a and 486f to separate from tag portion 414. As shown in FIG. 24D-24F, the user may then stretch and wrap leg segments 486a-486f around package 42 to hold package 42 in a closed configuration.

As shown above in FIG. 24D, the expanded loop of attachment tag 410 is defined by leg segments 486a-486f and bonding segment 420. The remaining section of tag portion 414 does not define the expanded loop. As can be appreciated, when elastomer portion 416 includes an "even" number of leg segments 486, such that the end leg segments 486 are integrally connected to the same bonding segment 420 at the same end of attachment tag 410, only the bonding segment 420 forms a portion of the loop when leg segments 486 are separated and stretched. However, in comparison, when elastomer portion 416 includes an "odd" number of leg segments 486, such that the end leg segments 486 are integrally connected to bonding segment 420 at opposing ends of attachment tag 410, tag portion 414 forms a portion of the loop when leg segments 486 are separated and stretched.

FIGS. 25A and 25B illustrate yet another embodiment for attachment tag 410. In this embodiment, elastomer portion 416 is separated into eight leg segments 486a-486h having a switchback pattern that is transverse to those shown above in FIGS. 18A-24F. In this embodiment, attachment tag 410 includes a pair of bonding segments 420a and 420b, where elastomer portion 416 may be fully cut at the right-most bonding segment 420b via separation lines 490 having a V-shaped pattern. Furthermore, the right-most bonding segment 420b includes a cross-shaped slit 492, desirably extending through tag portion 414 and elastomer portion 416.

As further shown, leg segment 486a is integrally connected with bonding segment 420a, and leg segment 486h is cut-separated from bonding segment 420b. As shown in FIG. 25B, second face 414b includes adhesive layer 418, which desirably does not extend over bonding segment 420b to provide access to slit 492 during use.

During use, attachment tag 410 may be adhered to a package in the same manner as discussed above. The user may then separate and pull the V-shaped tip of leg segment 486h (referred to as tip 494) from tag portion 414, and separate and stretch the remaining leg segments 486a-486g. The user may then wrap leg segments 486a-486h around the package and insert tip 494 into slit 492 to secure leg segment 486h to tag portion 414 at bonding segment 420b. If desired, leg segment 486h may be pulled further through slit 492 to increase the engagement to bonding segment 420b and to tighten the loop.

Figure 27:
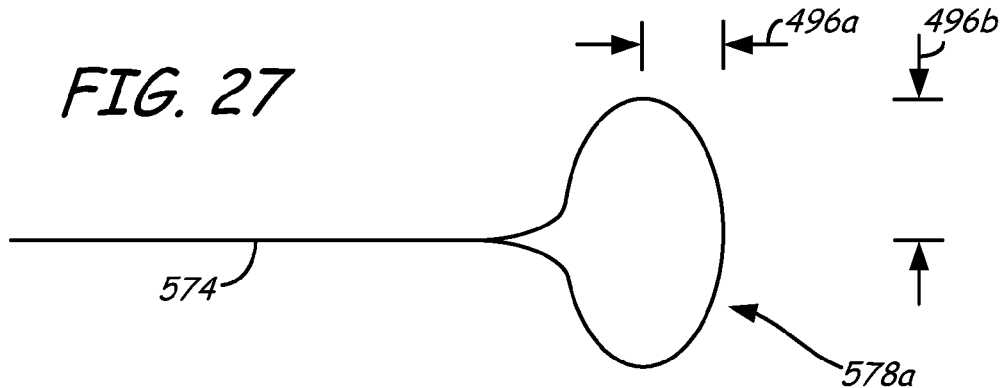
FIG. 27 illustrates a rounded termini having an elliptical geometry that is cross cut relative to a separation line.
Figure 28:
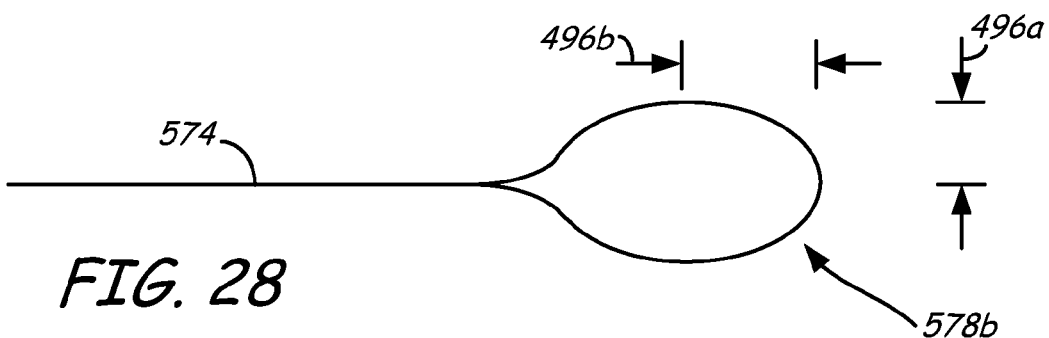
FIG. 28 illustrates a rounded termini having an elliptical geometry that is in line with a separation line.
Figure 29:
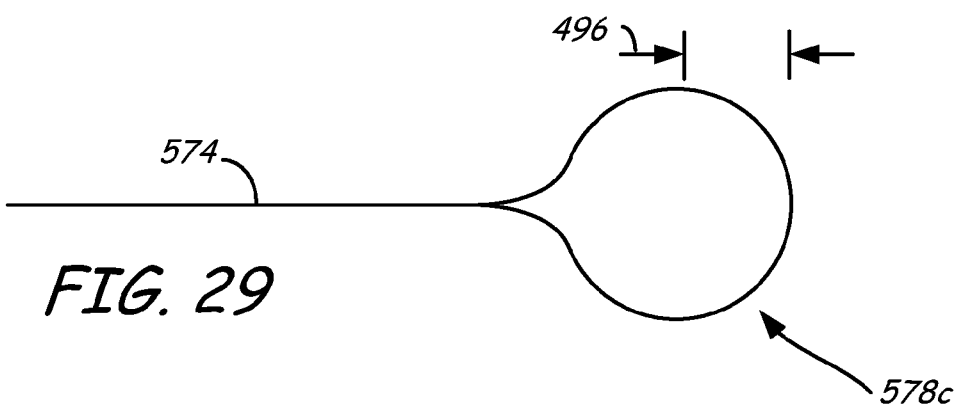
FIG. 29 illustrates a rounded termini having a circular geometry with a single average radius.

FIGS. 27-29 respectively illustrate rounded termini 578a-578c, which are example embodiments for rounded termini 178 and 478 used with attachment tags 110 and 410, (or any attachment tag of the present disclosure). As shown in FIG. 27, rounded termini 578a has an elliptical geometry that is cross cut relative to separation line 574. Examples of suitable radii along the short axis of rounded termini 578a (referred to as short radius 496a) range from about 0.02 inches to about 0.05 inches, more suitably from about 0.03 inches to about 0.04 inches. Examples of suitable radii along the long axis of rounded termini 578a (referred to as short radius 496b) range from about 0.05 inches to about 0.08 inches, more suitably from about 0.06 inches to about 0.07 inches.

As shown in FIG. 28, rounded termini 578b has an elliptical geometry that is in line with separation line 574. Examples of suitable dimensions for short radius 496a and long radius 496b include those discussed above for rounded termini 578a, where the axis of rounded termini 578b is transverse to the axis of rounded termini 578a.

As shown in FIG. 29, rounded termini 578c has a circular geometry with a single average radius 496. Examples of suitable radii for average radius 496 range from about 0.05 inches to about 0.08 inches, more suitably from about 0.06 inches to about 0.07 inches. When tested with attachment article 410 as shown in FIGS. 23A, 23B, and 24A-24F, each of rounded termini 578a-578c is capable of an average maximum load at break of at least one pound, and exhibited an average maximum extension at break of at least about 23 inches.

Overall, rounded termini 578c having a circular geometry exhibits the greatest combination of maximum load at break (above 1.2 pounds) and maximum extension at break (above 28 inches). In comparison, a corresponding attachment tag 410 without any rounded termini exhibited an average maximum load at break of less than one pound, and an average maximum extension at break of about 20 pounds. As such, the attachment tags of the present disclosure having rounded termini (e.g., attachment tags 110 and 410), particularly with circular dimensions, increase the amount of stretching that the elastomer portions 416 are capable of achieving without tearing or otherwise breaking. This accordingly increases the size of packages that may be reclosed with attachment tags 110 and 410. Furthermore, alternative rounded termini for use with attachment tags 110 and 410 may have geometries that vary between the circular geometry of rounded termini 578c and the elliptical geometries of rounded termini 578a and 578b.

Each attachment tag of this disclosure thus provides structure and function to attach the attachment tag to an item (whether, for example, by adhesive or by some form of mechanical engagement of the portion of the attachment tag with the item) and then a further engagement of the elastomeric portion of the attachment tag with the item (or with a portion of the tag portion of the attachment tag) in order to further envelope the item.

U.S. Provisional Patent Application Nos. 61/694,597 and 61/736,962 are incorporated by reference in their entireties.

King et al., U.S. Pat. No. 7,836,622; Ludlow et al., U.S. Pat. No. 7,281,345; and Ludlow et al., International Application Publication No. WO07/084119; and Maltas et al., U.S. Pat. No. 7,763,135 are incorporated by reference in their entireties to the extent that they do not conflict with the present disclosure. Although the present disclosure has been described with reference to several embodiments, workers skilled in the art will recognize that changes may be made in form and detail without departing from the spirit and scope of the disclosure.

The invention claimed is:

1. An attachment tag including:
a tag portion including a hook;
an adhesive layer disposed on a surface of the tag portion and configured to adhere to a product; and
an elastomer portion including:
an expandable portion and an aperture configured to engage the hook; and
a layer portion that is co-extensive with the expandable portion, and includes a bond zone that is bonded to the tag portion.

2. The attachment tag of claim 1, wherein the expandable portion further includes a plurality of extendable leg segments.

3. The attachment tag of claim 2, wherein the plurality of extendable leg segments are configured to define an expandable loop.

4. The attachment tag of claim 2, wherein the plurality of extendable leg segments are bordered by rupturable separation lines.

5. The attachment tag of claim 1, wherein the elastomer portion includes a tab in which the hook-engaging aperture is positioned.

6. An attachment tag including:
a tag portion having a first surface and a second surface;
an adhesive layer disposed on the second surface of the tag portion and configured to adhere to a product;
an elastomer portion including:
an expandable portion configured to further secure the attachment tag to the product or to secure the attachment tag to a second product; and
a layer portion that is co-extensive with the expandable portion, and includes a bond zone that is bonded to the first surface of the tag portion; and
a release liner underlying at least an entirety of the tag portion, the release liner being disposed against the adhesive layer.

7. The attachment tag of claim 6, wherein the expandable portion further includes an expandable loop.

8. The attachment tag of claim 6, wherein the elastomer portion further includes a transition portion disposed between the expandable portion and the layer portion.

9. The attachment tag of claim 6, wherein the expandable portion is provided in the form of a sheet.

10. The attachment tag of claim 6, wherein the adhesive layer includes a pressure sensitive adhesive.

11. The attachment tag of claim 6, wherein the expandable portion includes a plurality of extendable leg segments.

12. The attachment tag of claim 11, wherein the plurality of extendable leg segments are configured to define an expandable loop.

13. A supply of multiple attachment tags, the supply including:
a release liner having a first surface and a second surface, the first surface having one or more release agents;
the multiple attachment tags that are removably affixed to the release liner, each including:
an adhesive layer releasably adhered to the first surface of the release liner;
a tag portion disposed against the adhesive layer on an opposing side from the release liner; and
an elastomer portion including:
an expandable portion; and
a layer portion that is co-extensive with the expandable portion, wherein the layer portion includes a bond zone that is bonded to the tag portion and is spaced from the expandable portion;
wherein the release liner underlies at least an entirety of each tag portion.

14. The supply of claim 13, wherein the release liner with the removably affixed attachment tags is provided in a roll configuration.

15. The supply of claim 13, wherein adjacent attachment tags are separated from each other by spacings along the liner.

16. The supply of claim 13, wherein, for each attachment tag, the expandable portion further includes an expandable loop.

17. The supply of claim 13, wherein the adhesive layer includes a pressure sensitive adhesive.

* * * * *